(12) United States Patent
Kirchhofer et al.

(10) Patent No.: US 11,077,592 B2
(45) Date of Patent: Aug. 3, 2021

(54) METHOD FOR PRODUCING A TOOTHBRUSH, AND TOOTHBRUSH

(71) Applicant: TRISA HOLDING AG, Triengen (CH)

(72) Inventors: Roger Kirchhofer, Reitnau (CH); Michael Schär, Egolzwil (CH); Martin Zwimpfer, Lucerne (CH); Peter Zurfluh, Alpnach-Dorf (CH)

(73) Assignee: TRISA HOLDING AG, Triengen (CH)

( * ) Notice: Subject to any disclaimer, the term of this patent is extended or adjusted under 35 U.S.C. 154(b) by 673 days.

(21) Appl. No.: 15/835,993

(22) Filed: Dec. 8, 2017

(65) Prior Publication Data

US 2018/0098617 A1   Apr. 12, 2018

Related U.S. Application Data

(63) Continuation of application No. 14/236,935, filed as application No. PCT/CH2012/000175 on Jul. 25, 2012, now abandoned.

(30) Foreign Application Priority Data

Aug. 5, 2011   (EP) ...................................... 1405297

(51) Int. Cl.
  *B29C 45/16* (2006.01)
  *A46B 5/00* (2006.01)
  (Continued)

(52) U.S. Cl.
  CPC ............ *B29C 45/1615* (2013.01); *A46B 5/00* (2013.01); *B29C 45/14336* (2013.01);
  (Continued)

(58) Field of Classification Search
  CPC ............ B29C 45/1642; B29C 45/1643; B29C 45/1645; B29C 2045/1651; B29C 2045/1653; B29C 2045/1654
  (Continued)

(56) References Cited

U.S. PATENT DOCUMENTS 5,781,958 A   7/1998  Meessmann et al.
6,394,094 B1  5/2002  McKenna et al.
(Continued)

FOREIGN PATENT DOCUMENTS

DE   4404672 A1 *  8/1995  ......... B29C 45/1642
DE   4404672 A1    8/1995
(Continued)

OTHER PUBLICATIONS

Schwarz et al., Otto, Kunststoffverarbeitung (Plastics Processing), 8th Ed., Wurzburg: Vogel, 1999, 7th ed. under the title: Kunststoffverarbeitung (Plastics Processing) ISBN 3-8023-1803-X.
(Continued)

*Primary Examiner* — Atul P. Khare
(74) *Attorney, Agent, or Firm* — Oliff PLC

(57) ABSTRACT

A grip body of a body care article, such as toothbrush, includes a grip part, a neck part, and a head part. The grip body includes a first and a second material component of a thermoplastic plastic. Manufacturing of the grip body is performed via an injection moulding tool with at least one tool cavity, and the grip body including a first, second, and third material component of a first, second, and third thermoplastic material, respectively.

22 Claims, 8 Drawing Sheets

(51) Int. Cl.
*B29C 45/14* (2006.01)
*B29L 31/42* (2006.01)
*B29C 45/00* (2006.01)
*B29C 45/28* (2006.01)
*A46B 5/02* (2006.01)
*B29C 45/27* (2006.01)

(52) U.S. Cl.
CPC .......... *B29C 45/16* (2013.01); *B29C 45/1642* (2013.01); *A46B 5/02* (2013.01); *A46B 2200/1066* (2013.01); *B29C 45/1645* (2013.01); *B29C 45/27* (2013.01); *B29C 2045/0027* (2013.01); *B29C 2045/0034* (2013.01); *B29C 2045/167* (2013.01); *B29C 2045/1654* (2013.01); *B29C 2045/2893* (2013.01); *B29L 2031/425* (2013.01); *Y10T 16/476* (2015.01)

(58) Field of Classification Search
USPC ....................................................... 264/328.8
See application file for complete search history.

(56) References Cited

U.S. PATENT DOCUMENTS

| | | | |
|---|---|---|---|
| 7,083,756 B2* | 8/2006 | Strahler | A46B 5/02 |
| | | | 264/328.8 |
| 7,921,499 B2 | 4/2011 | Huber et al. | |
| 8,510,893 B2 | 8/2013 | Wong et al. | |
| 8,840,192 B2* | 9/2014 | Lotscher | A46D 3/045 |
| | | | 300/21 |
| 2003/0070259 A1 | 4/2003 | Brown et al. | |
| 2003/0070309 A1 | 4/2003 | Brown et al. | |
| 2004/0010876 A1 | 1/2004 | Kraemer | |
| 2005/0170113 A1* | 8/2005 | Hill | B29C 49/22 |
| | | | 428/35.7 |
| 2006/0213018 A1 | 9/2006 | Gross et al. | |
| 2009/0188063 A1 | 7/2009 | Baertschi et al. | |

FOREIGN PATENT DOCUMENTS

| | | | | |
|---|---|---|---|---|
| EP | 2279956 | A2 | 2/2011 | |
| EP | 2347673 | A1 * | 7/2011 | ............ A46D 3/045 |
| JP | 5031756 | | 2/1993 | |
| JP | H105104580 | A | 4/1993 | |
| JP | 2002153322 | A * | 5/2002 | ......... B29C 45/1643 |
| JP | 2002153322 | A | 5/2002 | |
| JP | 2004114482 | A | 4/2004 | |
| JP | 2011046208 | A | 3/2011 | |
| WO | 9406612 | A1 | 3/1994 | |
| WO | 99/56934 | A1 | 11/1999 | |
| WO | 2004/026162 | A2 | 4/2004 | |
| WO | 2011075133 | A1 | 6/2011 | |

OTHER PUBLICATIONS

Nov. 3, 2016 U.S. Office Action Issued in U.S. Appl. No. 14/236,935.

* cited by examiner

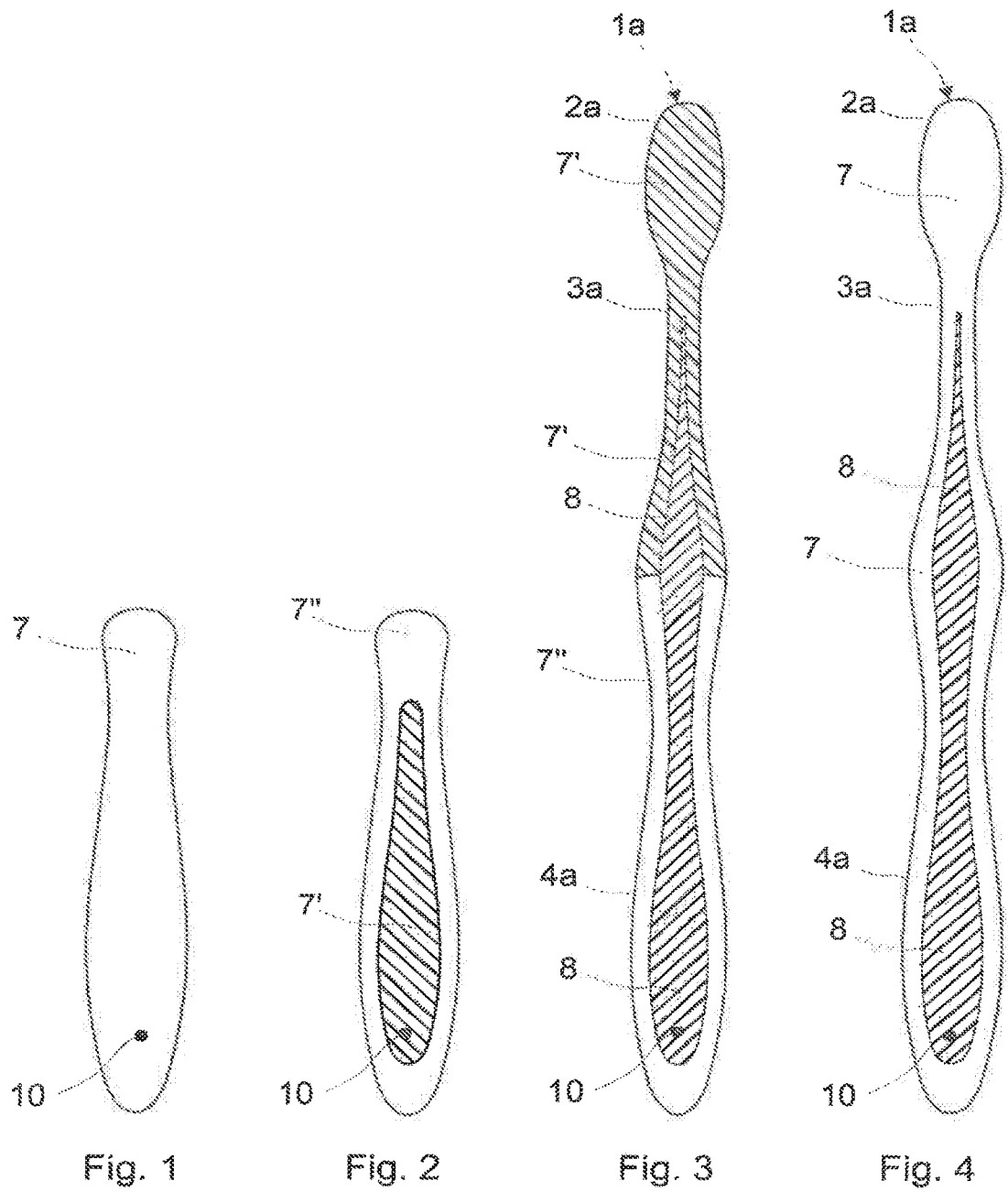

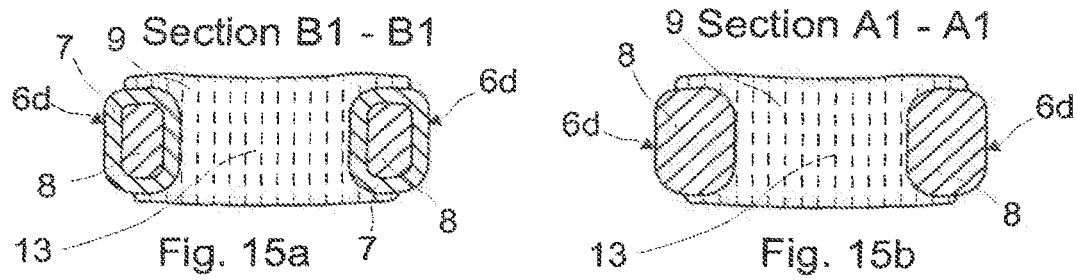
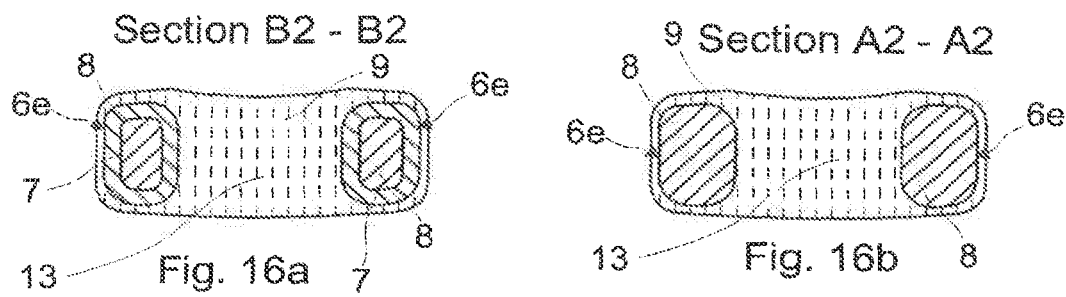
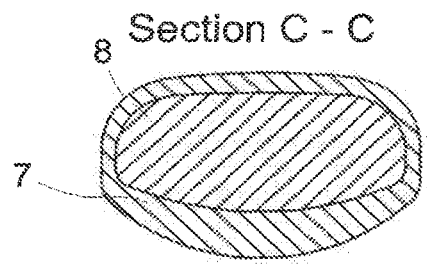
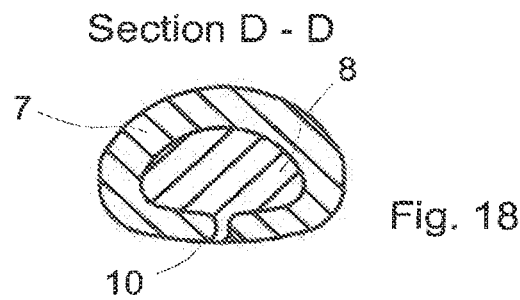

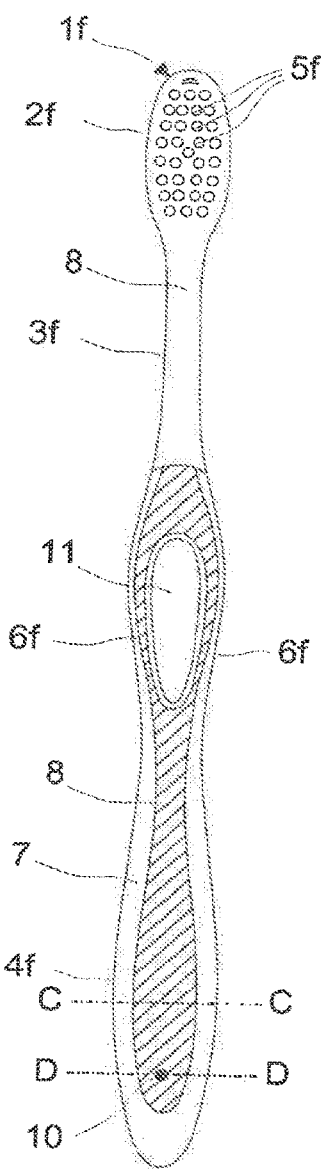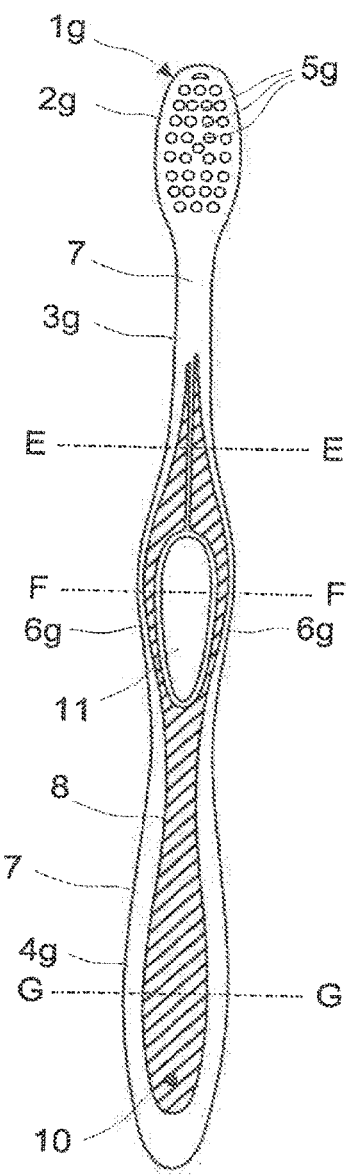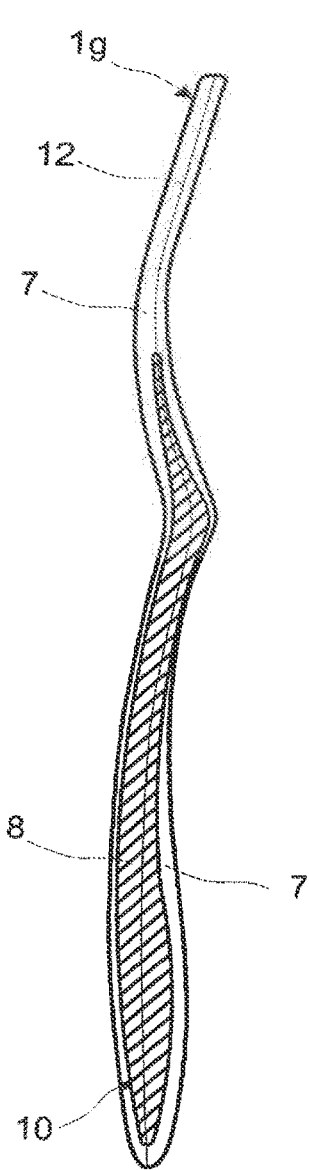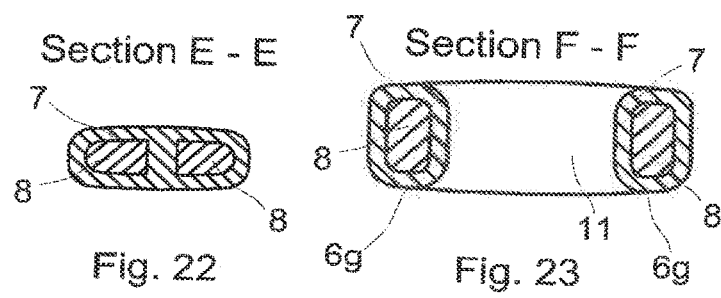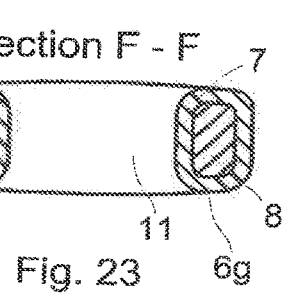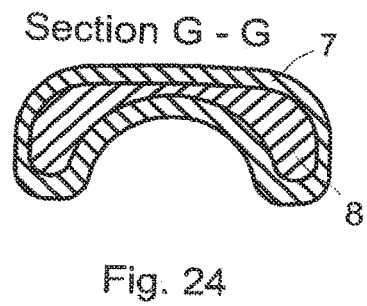

Section E - E

Section F - F

Section G - G

METHOD FOR PRODUCING A TOOTHBRUSH, AND TOOTHBRUSH

This is a Continuation of application Ser. No. 14/236,935 filed on Feb. 4, 2014, which in turn is a National Phase Application of PCT/CH2012/000175 filed on Jul. 25, 2012, which claims the benefit of EP 11405297.0 filed on Aug. 5, 2011. The disclosures of the prior applications is hereby incorporated by reference herein in its entirety.

BACKGROUND OF THE INVENTION

Field of the Invention

The invention relates to the field of grip bodies, in particular for body care articles or cosmetic articles, such as toothbrushes, tongue cleaners, wet-shaving sticks, oral hygiene articles, mascara applicators, nail varnish applicators, lipstick applicators, etc. The invention in particular relates to a grip body for a toothbrush, with a grip part, with a neck part and with a head part, wherein the grip body comprises at least one first and a second material component of thermoplastic plastic. The invention moreover relates to a method for manufacturing such a grip body as well as to an injecting moulding tool for carrying out the method.

Description of Related Art

It is known to manufacture grip bodies for body care and cosmetic products, in particular for toothbrushes, of plastic by way of an injection moulding method, wherein the grip body is injection moulded from several different thermoplastic plastics. For this, a first plastic component is injected into a first tool cavity of an injection moulding tool, wherein the tool cavity is completely filled. The tool cavity here does not represent a negative mould of the finished grip body, but the negative mould of the part-body of the first material component. The part-body of the first material component is subsequently reapplied into a further tool cavity, which is larger than the part-body. The empty space between the part-body and the cavity wall is then peripherally injected with a second material component, wherein this connects to the first material component, for example with a material fit or positive fit. A grip body of two different thermoplastic material components is moulded in this manner. Further material components can yet be attached by way of repetition of the previously mentioned steps. This method however has a few disadvantages. Thus, the tooling costs are quite high due to the use of several tool cavities for the manufacture of an injection moulded part. Moreover, the manufacturing speed and thus the productivity are comparatively low due to the reapplication step.

Moreover, it should be noted that an additional injection point (gating point) arises with each material component that is injected. Injection points however compromise the appearance of a grip body, so that the number of such injection points or of injection points on the surface is to be kept as low as possible.

Moreover, the fashioning or design possibilities of the grip body manufactured from different material components remain limited despite the mentioned technical possibilities. A so-called interflowing of different plastic components is not possible, or can only be implemented by way of the application of complicated and expensive injection moulding moulds.

BRIEF SUMMARY OF THE INVENTION

It is therefore the object of the invention, to provide a grip body of the initially mentioned type, which comprises two or more material components of plastic, which with regard to their functional purpose are arranged in the grip body in a targeted manner. The grip body should be manufacturable in a simple manner with few method steps as well as inexpensively despite the application of different functional material components in the grip body. The manufacture of the injection moulding mould should be inexpensive and make do with a minimal sequence of cavities. Advantageously therefore, several material components should be injected in a cavity. Moreover, the grip body should permit a high degree of automatisation in manufacture and be manufacturable in large piece numbers.

The invention is achieved by the independent claims. The dependent claims contain particular embodiments and further developments of the invention. Thereby, features of the method claims, the device claims and the product claims can be combined with one another where it makes sense.

The invention is then characterised in that the first and second material components have a common injection point (gate point) which is arranged outside a mould partition line formed by the mould partition. The grip body comprises a head part, on which a functional part, e.g. a brush body, a cosmetics applicator or a blade arrangement is arranged, a grip part, at which the grip body is held by the user and a neck part that connects the grip part and head part to one another.

In a preferred further development of the grip body, at least the grip part comprises a jacket body of the first material component and a core body of the second material component, which is at least partly enveloped, by the jacket body. The jacket body is preferably characterised in that this at least partly forms the surface of the grip part or of the grip body.

The second material component can be arranged only in the grip part, only in the grip part and neck part or in the grip part as well as in the neck part and head part. The second material component can also be formed in the neck part or in the neck part and head part as a core body, which is surrounded at least partly or even completely, by a jacket body of the first material component.

In a preferred embodiment of the invention, the grip body, preferably with the exception of the injection point, comprises a core body of the second material component which is completely surrounded by the jacket body of the first material component and which is only formed in the grip part, in the grip part and the neck part or in the grip part, neck part and head part.

Moreover, one can also envisage the core body in the grip part, in the neck part and/or in the head part, in regions breaking through the jacket body to the surface of the grip body and forming a surface section of the grip body.

The jacket body of the first material component, which surrounds the second material component, can e.g. have a thickness of 0.5-5 mm and in particular of 1.5-3 mm.

According to a particularly preferred embodiment of the invention, the second material component formed in the grip part as a core body, towards the head part, breaks out of the enveloping jacket body of the first material component and comes to the surface of the grip body. According to this embodiment, the head part can consist completely of the second material component. This embodiment is based on the finding that the material component in the head part is to fulfil a different technical function than the material component in the grip part. For this reason, different material components should be used in the grip part and the head part. Thus, for example, it could be important for the material component, which forms the surface of the grip part, to be characterised by good haptics, whereas the material component forming the head part should ensure a sufficient stiffness.

Moreover, it is possible in the grip part to use a material which is not suitable for certain functions in the head part and which for example is not suitable for the AFT method described later (the welding of carrier plates to the head part requires certain material combinations). Injection moulded interdental brushes can likewise be formed in this manner The grip as a first material component provides the stability, whilst the second material component shapes the bristle field region or the bristles, and this corresponds to different functionalities. Last but not least, it is also possible for less expensive or also recycled materials to be applied for the parts that are less functionally demanding, than for the functionally demanding parts.

The common injection point of the first and second material component is arranged on the front side or on the rear side of the grip body, preferably on the rear side of the grip body. The injection point is further preferably arranged in a middle longitudinal axis of the grip body. The front side is that side of the grip body, on which the functionally effective part of the functional part lies. With a toothbrush, this is the bristles. Moreover, a thumb rest for supporting the hold grip preferably also lies on the front side at the front end section of the grip part. The rear side is accordingly the side that is opposite to the front side.

Without any particular measures, the second material component comes to the surface of the grip body at the injection point. On account of this, one can envisage the first material component being injected again in such a quantity subsequently to the injection of the second material component, that the injection point is likewise formed from the first material point, so that the jacket body also consists of the first material at the injection point. The second material component is completely enclosed by material of the first material component in this manner.

The surface share, which the second material component assumes at the injection point, depends on above all on the cooling time of the first material component. A longer cooling time entails less of a surface share than a short cooling time.

The mould partition line of the tool cavity is preferably located laterally between the front and rear side. Moreover, the injection point of the first and the second material component is preferably arranged in the grip part. The injection point is preferably distanced by 1 to 20 mm, and in particular 3 to 8 mm from the grip-side end. In the case that further material components are applied, their injection point can be arranged on the grip point at any location in the longitudinal direction, and preferably on the middle longitudinal axis in the transverse direction.

In a particular further development of the grip body, this comprises at least one through-opening. The through-opening is preferably arranged in the grip part, the neck part or in the transition between the grip part and neck part. In the region of the through-opening, the grip body is temporarily divided into two or more part-arms in the longitudinal direction, and these part-arms unify again into a body and thus enclose the through-opening. The part-arms can in each case comprise a jacket body of the first material component and a line-like resp. a leg-like core body of the second material component that is enveloped by the jacket body, or consist of these. Moreover, it is also possible for the part-arms in cross section to only consist of the first or the second material component.

The two line-like core bodies then, with the coming-together of the part-arms towards the head part can
a. reunify, and run further as a common, line-like core body enveloped by the jacket body, or
b. run further parallel to one another towards the head part as separate part-lines enveloped by the jacket body, and preferably run out in a tongue-like manner in the neck part or head part.

The grip body preferably comprises at least one third material component of a thermoplastic plastic which is preferably soft-elastic, and for example consists of a thermoplastic elastomer. The third material component for example is integrally formed on the grip body in a separate injection moulding step and amid the formation of its own injection point in a further injection moulding cavity.

The third material component e.g. serves for forming a thumb rest. Moreover, this third material component can also be provided for decorative purposes or due to ergonomic aspects as a holding element in the grip body. Moreover, the third material component can also serve for the covering of a longitudinal section of the grip region in the region of a break-out of the second material component from the first material component. The subsequent embodiment examples are referred to with regard to a detailed description with respect to this.

The third material component is integrally formed onto the grip body for example in the region of a through-opening described above. The third material component can partly or completely cover the part-arms and/or close the through-opening. Moreover, the third material component can also be arranged in other regions on the grip body. The application of the third material component at a through-opening can also be aimed at local increase of the flexibility of the grip body.

Yet further material components can be integrally formed, apart from the third material component. These can be designed in each case as hard components or soft components, and be arranged in the head part, neck part and/or grip part. The further material components can likewise be processed according to the invention in the same manner as the first and second material components. The third and, as the case may be, further material components can contact only the first, only the second, or the first and the second material component.

Moreover, it is however also possible not to process the mentioned first and second material component first of all in the injection moulding method. Thus, firstly, a base body, preferably of one or more hard components and, as the case may be, partly of soft components can be manufactured. Subsequently, the first and the second material components can be applied onto the base body. As the case may be, the mentioned third or further material components can yet be attached subsequently to this. Further special geometric arrangements of the material components according to the invention are possible in the grip body by way of this. Thus, the base body provides a basis for a further material body, for example in order to apply the material combination according to the invention at special locations in the grip body. Thus, for example a grip part can be injection moulded as a base body, wherein subsequently the method according to the invention is only applied in the region of the neck part and/or head part.

The grip body of the first and second material component is preferably reapplied into a further tool cavity, for integrally forming the third or further material components. The third or further material component is then injected in this tool cavity. As mentioned, the mentioned through-opening on the grip body can serve for the creation of a thumb rest. The through-opening is partly or completely peripherally injected with a material component for this.

The first and second material component can differ in the material nature and/or colour. Preferably, the two material components consist of different plastics and/or of different colours or transparencies. As a special design, thus the first and second material component of the same material with different colours can be applied.

The following material combinations are possible:

|  | first material component | second material component |
| --- | --- | --- |
| combination 1: | hard component | hard component |
| combination 2: | hard component | soft component |
| combination 3: | soft component | hard component |
| combination 4: | soft component | soft component |

The hard component is characterised by a hard grip and a comparatively high bending stiffness. It is applied in particular in the head part and neck part and also as a core body in the grip part and gives the body stability. It is clear from this that the second material component is particularly preferably a hard component.

Two equal materials with different colours or two different materials with the same or different colours can explicitly be used with a combination of 1 and 4.

Different thermoplastic plastic can be used as hard components. Thus in particular the following thermoplastic plastic is suitable as a hard component:
 styrene polymerisates such as styrene acrylonitrile (SAN), polystyrene (PS), acrylonitrile butadiene styrene (ABS), methyl methacrylate styrene (SMMA) or butadiene styrene (SB);
 polyolefins such as polypropylene (PP) or polyethylene (PE), for example also in the form of high density polyethylene (HDPE) or low density polyethylene (LDPE);
 polyesters such as polyethylene terephthalate (PET) in the form of acid-modified polyethylene terephthalate (PETA) or glycol-modified polyethylene terephthalate (PETG), polybutylene terephthalate (PTB), acid-modified polycyclohexylene dimethylene terephthalate (PCT-A) or glycol-modified polycyclohexylene dimethylene terephthalate (PCT-G);
 cellulose derivatives such as cellulose acetate (CA), cellulose aceto butyrate (CAB), cellulose propionate (CP), cellulose acetate phthalate (CAP) or cellulose butyrate (CB);
 polyamides (PA) such as PA 6.6, PA 6.10 or PA 6.12;
 polymethyl methacrylate (PMMA);
 polycarbonate (PC);
 polyoxymethylene (POM);
 polyvinyl chloride (PVC);
 polyurethane (PUR)

Particularly preferably however, polypropylene (PP) or an acid-modified polycyclohexylene dimethylene terephthalate (PCT-A) is applied as a hard component. PCT-A on account of its excellent transparent characteristics is particularly suitable as the first material component which as is known forms the jacket body. The hard component of PP preferably has an E-module of 100-2400 N/mm$^2$, preferably of 1300 to 1800 N/mm$^2$.

The soft component is characterised by its soft-elastic characteristics which applied on the surface of the grip body ensures a pleasant grip (haptics). It is particularly clear from this that the first material component or also the third and further material component is a soft component.

Different thermoplastic elastomers (TPEs) can be applied as soft components. Thus in particular the following thermoplastic elastomers are applied as soft components:
 thermoplastic polyurethane elastomers (TPE-U)
 thermoplastic styrene elastomers (TPE-S) such as styrene ethylene butylene styrene copolymer (SEBS) or styrene butadiene styrene copolymer (SBS)
 thermoplastic polyamide elastomers (TPE-A)
 thermoplastic polyolefin elastomers (TPE-O)
 thermoplastic polyester elastomers (TPE-E)

TPE-S is preferably applied as a soft component. Moreover, the thermoplast polyethylene (PE) and polyurethane (PU) can be used as hard components as well as soft components. The Shore A hardnesses of the soft component preferably lie below 90 Shore A.

The first and second material component and in particular the soft components and the hard component preferably form a material fit in the injection moulding method. However, it is also conceivable not for a material fit to arise, but a positive fit, depending on the choice of the material components and the method parameters. Regions with a material fit and positive fit can alternate.

Moreover, the applied material components can also have a different shrinkage behaviour (shrinkage degree) or material-fit behaviour, so that a special optical effect sets in at the contact surface of the first and second material component.

The inner material component in this case has a higher shrinkage degree than the outer material component. With this, the inner material component shrinks greater than the outer material component, by which means a gap arises. Such an effect can arise for example if the first material component is a PCTA, and PP is used as a second material component. The effect arises due to the different shrinkage behaviours and an empty space (vacuum) or partition surface between the two components arising by way of this.

The geometric design of the body per se can support this optical effect or render it having an improved effect. Thus, for example triangular shapes support these optical effects.

Moreover, it is also possible for the mentioned effect to be triggered not until a bending of the body. I.e. the layers separate by way of the bending, by which means the empty space or a partition surface is created.

The grip body is preferably used as a grip body of a manual or electrical toothbrush (grip housing). These can be disposable or multiple-use toothbrushes in the field of manual toothbrushes. The electrical toothbrushes can execute oscillating, pivoting, translatory or combined movements. Furthermore, the electrical toothbrushes can be designed e.g. as sonic toothbrushes or vibration toothbrushes. Moreover, the grip body according to the invention can also be applied in tongue cleaners, in apparatus for dental interstice care, such as interdental brushes, flossers, toothpicks or interdental cleaning apparatus that combine the mentioned interdentally brushes, flossers and toothpicks, with wet shavers or generally with body care applicators. Such body care applicators can e.g. be nail varnish brushes or mascara applicators. Moreover, the grip body according to the invention can be used in household articles. These e.g. can be brooms, floor wipers, or dishwashing brushes.

One aspect of the invention is the application of this in the field of the housing of electrical toothbrushes or generally toothbrushes with hollow bodies as grip bodies. These bodies are preferably at least partly designed similarly to hollow cylinders and have relative thin wall thicknesses. The second material component is likewise injected after the injection of the first material component. This second material component due to the relative thin-walled design at least partially comes to the surface and is also at the surface in the region of the injection point. For example, this application can serve the formation of functional elements at or on the hollow body. For example, a hard component can be used as a first material component and a soft component as a second material component. The soft components can be applied in the region of the location that is used for operating the on/off switch or other switches.

The toothbrush manufactured out of the grip body according to the invention comprises a bristle field of a plurality of individual bristles and which is applied in the head part. The head part consists of a hard component, and can supplementary also comprise a soft component. The soft component can serve the formation of a tongue cleaner on the rear side of the head part or also the formation of soft-elastic massage elements and cleaning elements in the bristle field. The bristle field can be attached onto the head part by way of known technology. The bristles of a bristle field can consist of a different or of the same material.

The bristles can for example be injected and for example consist of one of the following plastics:
  polyamide elastomer (e.g. Grilflex ELG 5930 of Ems-Chemie AG)
  polyester elastomer (e.g. Riteflex 672 RF Nat or Riteflex RKX 193 RF Nat of Ticona Polymers or Hytrel 7248 of DuPont).

The plastics for injected bristles for example have a Shore D hardness of 0 to 100, preferably 30 to 80.

Conventionally manufactured bristles, which for example can be pointed or cylindrical, are preferably manufactured of polyamide (PA) or polyester (PBT).

The fastening of the bristles in the head part can be affected in different manners. For example, the anchor free tufting (AFT) method can be applied. With the AFT method (anchor free tufting) the conventional cylindrical or pointed bristles or the bristle bundle are fastened on the head part or a carrier platelet without the help of an anchor. The rounded bristles thereby are profiled in a bundled manner and with their end that is opposite to the free used end are pushed through openings in the carrier platelet, so that an end region of the bristle bundle projects beyond the lower side of the carrier platelet. The bristles are fastened by way of melting, bonding or welding, on this end region of the bristles that projects beyond the lower side of the carrier platelet. The carrier platelet with the conventional bristles fastened therein is then anchored in the recess of the head region of the toothbrush, for example by way of ultrasonic welding. The recess in the head region thereby is specially adapted to the geometry of the carrier platelet. The carrier platelet or also the head region of the toothbrushes, apart from the conventional bristles, can comprise soft-elastic massage and cleaning elements.

Alternatively, a hard component or soft component is injected over the carrier platelet in an injection moulding tool, in order to form the grip body around the carrier platelet.

Furthermore, the bristles can be fastened in the grip body by way of the conventional anchoring method. For this, the bristle bundle is folded by way of a metal anchor platelet and subsequently fixed in bristle receiving holes. The bristle bundle comprises two halves due to the folding by way of the anchor, and these halves in each case encompass one of the ends of the folded bristles. The post-machining such as profiling and cutting is subsequent to the fastening of the bristles, depending on the bristle type. The head region of the toothbrush with the bristle receiving holes can thereby additionally be provided with soft-elastic massage elements and cleaning elements.

Of course, other bristling methods such as IAP (integrated anchorless production) or IMT (in mould tufting) can also be used for the insertion of the bristles. As described, the bristles can of course be formed directly from the plastic material in the injection moulding tool by way of injection moulding.

So-called bio-plastics are likewise useable as bristle material or as one of the material components. These are plastics that are manufactured of renewable raw materials.

The invention moreover relates to a method for manufacturing an elongate grip body of a body care article, in particular a toothbrush, from at least two material components. The method also relates to the injection moulding of at least two material components in an injection moulding tool by way of a hot-runner method. In known injection moulding methods according to the hot-runner method, a part-body of a first material component is injected in a first tool cavity of an injection moulding tool. The part-body is subsequently reapplied into a further and larger tool cavity, into which a second material component is injected, which fills out the remaining mould cavity in the tool cavity and connects to the first material component with a positive fit. This method however is very complicated and accordingly expensive.

The method according to the invention is thus characterised in that at least two plastic components are injected via a common injection point into a common tool cavity of the injection moulding tool by way of the subsequently mentioned method steps. The method steps comprise:
  injection moulding a first material component into the tool cavity and partial filling of the tool cavity with the first material component through a hot-runner nozzle;
  cooling the injected first material component in the tool cavity, wherein at least one flowable soul is preserved in the first material component;
  injection moulding a second material component into the tool cavity of the injection moulding tool through the same hot-runner nozzle and further, preferably complete filling of the tool cavity with the second material component.

As regards to the tool cavity, this is preferably designed as a longitudinal cavity with a longitudinal axis, in a manner corresponding to the nature of the grip part to be manufactured. If the tool cavity is completely filled with the second material component, then on injecting the second material component, the injection pressure is maintained for completion of the injection moulding step and a so-called holding pressure applied, so that the tool cavity is completely filled. This holding pressure however is done away with on injecting the first material component, since the tool cavity is not completely filled with the first material component and thus also no counter-pressure arises.

The first and the second material component are injected temporally one after the other and not with one another, into the same tool cavity. A cooling phase, in which the first material component cools and partly solidifies in the tool cavity, is effected between the injection of the first and second material component. The tool cavity or its walls can be actively cooled in the cooling phase. The cooling phase can e.g. be 2 to 35 seconds. Amongst other things, it is dependent on the design of the grip body.

The wall thickness of the first material component can be significantly influenced by the intensity and the duration of the cooling. It is now possible not to cool the tool cavity in a uniform or symmetrical manner but to cool different regions of the tool cavity differently greatly or for a differently long period of time, so that different wall thickness of the first material component arise seen over the component. This means that the component cools to a different extent or solidifies to a different extent. This in turn influences the design of the flowable soul and thus the flow behaviour and the distribution of the subsequently injected second material component in the tool cavity. For this reason, one can achieve special structures in the material distribution in the grip body by way of a targeted or asymmetrical cooling of the tool cavity or cavity wall. These particular structures can serve a functional purpose and/or contribute to a particular optical appearance.

Thus, the first material component in the tool cavity has already cooled somewhat at the point in time of the injection of the second material component. The outer regions of the mould mass solidify first of all whilst the core cools last of all and remains flowable for longer, since the cooling of the mould mass departs from the wall of the tool cavity. For this, the cavity wall can be actively cooled, in order thus to be able to better control the solidification process. The cooling however can also be effected passively, by way of heat removal through the injection moulding tool.

This means that at a certain stage of the process, the injected first mould mass has an outer jacket body towards the cavity wall, and this body is no longer flowable due to the advancing solidification process. Not flowable in this context means that this mould mass cannot be displaced by the second material component in the subsequent further injection moulding step. The mould mass however still comprises a warmer core body which is surrounded by the jacket body and in which the mould mass is still flowable. This core body is also called hot soul or plastic soul. The volume of the non-flowable jacket body as well as of the flowable core body at the point in time of the injection of the second material component can be controlled via the intensity of the cooling and the time interval between the first and the second injection moulding step, by way of a control device. Different distribution patterns of the two material components within the grip body can be achieved in dependence on the total volume of the injected first material component as well as on the volume of the flowable core body or of the jacket body. Such different material distributions are explained in more detail by way of the embodiment examples specified further below.

The hot soul of the first material component previously injected into the tool cavity is substituted by the second material component during the injection moulding of the second material component and is displaced in the material flow direction into a still empty region of the tool cavity. The first material component which bears on the cavity wall and which is at least partly solidified on the other hand is not displaced and at least partly surrounds the flowing-in second material component.

The injection point lies outside the mould partition line of the tool cavity. The tool cavity is preferably designed in an elongate manner and has a longitudinal axis, corresponding to the mature of an elongate grip body. The injection point is preferably applied such that the material components are injected into the cavity transversely to the longitudinal axis of the tool cavity. This means that the closure direction of the needles is preferably at an angle of 85° to 90° (angle degrees) to the longitudinal axis of the tool cavity. This effects a deflection of the material flow in the direction of the longitudinal axis that also corresponds to the material flow direction in the tool cavity when the material flow meets the opposite cavity wall or the jacket body. Hereby, the injected material is deflected in particular at the cavity wall lying opposite the injection point. This type of injection of the plastic components is known per se and is not new. Amongst other things, it is ensured by way of this that both end sections of the elongate tool cavity are completely filled with material.

In the present invention, this type of injection of the plastic components however has yet a further advantage. According to a first method step, specifically a part space of the tool cavity is first to be filled with the first material component. In particular, no material should penetrate into the space section of the tool cavity that is not yet to be filled. One can prevent the injected first material distributing over the whole length of the tool cavity due to the fact that the injection direction lies transversely to the longitudinal direction of the tool cavity.

The injection point can now be arranged on an end section of the grip body, so that the second material component only moves in one material flow direction and the hot soul is only displaced in the one material flow direction. However, one can also envisage the injection point being arranged between the end sections of the grip body, e.g. in a middle region, and the second material component propagating in two opposite material flow directions and the soul of the first material component being displaced in two opposite directions. In this manner for example, one can design a grip body that at two ends has a functional part of the second material component.

In a preferred further development of the invention, the subsequently injected second material component breaks out of the first material component surrounding this, in the material flow direction. The end section of the tool cavity which forms the head part and which is at the front in the material flow direction, is thereby filled with the second material component at least partly, preferably completely. This for example is the case if the total volume of the tool cavity minus the total volume of the injected first material component is greater than the flowable soul displaced by the second material component.

According to another further development of the invention, the second material component displaces the flowable soul of the first material component in the material flow direction, wherein the displaced soul in the material flow direction fills the front end section of the tool cavity, so that the second material component is completely surrounded by the first material component except for at the injection point. This for example is the case if the total volume of the tool cavity minus the total volume of the injected first material component is smaller than the flowable soul displaced by the second material component.

According to a particular further development of the invention, the tool cavity in the material flow direction or longitudinal direction temporarily divides into at least two part-channels that lead along the longitudinal axis around an insert core and subsequently reunify. The part-channels enclose at least one through-opening on the grip body to be manufactured.

On injecting the second material component, the flowable soul of the first material component is now displaced in the material flow direction into a front end section of the tool cavity. The second material component follows the tool cavity and the displaced soul whilst forming two part-lines through the part-channels. The two part-lines subsequently to the unification of the two part-channels in the neck part run separately and parallel to one another amid the formation of two tongue-like run-outs. In this case, the displaced soul completely fills out at least the head part.

The two part-lines have a distance of 0.3 mm to 3 mm, preferably of 0.5 mm to 1.5 mm. If the part-lines run out asymmetrically, which is to say that they are not equally long, then their ends have a distance in the longitudinal axis direction of maximally 10 mm, preferably of maximally 5 mm to one another.

According to a further particular design of the invention, the tool cavity in certain regions can be narrowed, so that a similar effect as with a through-opening is achieved.

After injecting the first material component, this due to the diameter ratio in the region of the narrowing at this location, from both sides will cool such that the two initially opposite layers already unify in the first cooling phase.

The second material component now will flow around this cooled zone on injecting. The second material component thereby follows the tool cavity and the displaced soul amid the formation of two part-lines through the part-channels. The two part-lines, subsequently to the unification of the two part-channels in the neck part now run separately and parallel to one another amid the formation of two tongue-like run-outs.

The diameter or the distance of the surfaces in the wall region, in which the layers unify, is between 0.3 and 5 mm preferably between 0.5 mm and 1.5 mm. Thereby, the wall thickness is directly related to the method. Greater masses necessitate more cooling time, and smaller masses less cooling time. Such a narrowing directly influences the cycle time, depending on how the remaining body is designed. The part-lines with regard to their dimensions are designed as previously described.

One can envisage the first material component being injected again in such a quantity subsequently to the injection of the second material component, that the injection point is likewise formed of the first material component, so that the jacket body also consists of the first material at the injection point.

In a further application, it is possible to design the surface of the first material component in a non-continuous, i.e. structured manner. This means that for example step-like steps or stages etc. can be integrated into the surface. This leads the flow of the second component behaving in a continuous manner and forming an opposite to the outer contour within the first material component.

According to a further application, the tool cavity is not of a constant size. The size of the tool cavity will change between the first and the second injection moulding step. This can serve to form special geometries in the grip part or also to achieve special optical effects. For this purpose, a core for example can be pulled after the introduction of the first material component for example, in order to enlarge the tool cavity, so that the second material component has further propagation possibilities.

The invention moreover also relates to an injection moulding tool for carrying out the method described above. The plastic molten mass as known is transported from a plastification assembly via a hot-runner system into the tool cavity on injection moulding thermoplastics.

Now, one differentiates between the so-called hot-runner technologies and cold-runner technology in injection moulding technology. Hot-runner technology or a hot-runner system is with the injection moulding of thermoplasts is indicated as a system which is thermally insulated and has a higher temperature, compared to the remaining injection moulding tool. A hot-runner system is thermally separated from the rest of the tool and is separately heated, so that the plastic molten mass therein remains permanently flowable. No solidification of the plastic in the hot-runner system occurs by way of this, and no sprue remains on the component. Furthermore, also longer flow paths can be realised by way of the hot-runner systems, since the pressure loss in the hot-runner system is not increased by a cooling of the molten mass and the increase in viscosity entailed by this.

The hot-runner ends at the hot-runner nozzle that represents the transition from the material feed to the tool cavity in the injection moulding tool. The hot-runner nozzles as well as the hot-runner system are set to the temperature window, in which the plastic can be plastically processed. A hot-runner regulation that permanently compares desired and actual temperatures and controls them with a closed loop is applied for the closed-loop control of the temperature. A hot-runner system moreover is a closed system, with which the injection point is closed by a particular technique. This is affected by one or more closure needles that are part of a needle closure system. The closure needles for example are actuated by a separately activatable mechanism, e.g. electrically, pneumatically or hydraulically.

With regard to the needle closure system, the gate diameter after the injection of the plastic mass is closed by the closure needle, which for example can be of steel. The displaced material is pressed into the plastic part. The needle is flush or aligned with the surface of the plastic part. One can therefore only see a round marking on the injected product. The hot-runner system described above is then applied in the injection moulding tool according to the invention.

In contrast, with the cold-runner system, the cold-runner system is not thermally insulated from the rest of the tool. The tool as well as the cold-runner system located therein is temperature-controlled to temperatures significantly below the processing temperature of the plastic. The thermoplastic plastic also solidifies in the cold-runner system during the production of a component due to this. This solidified plastic is called sprue or sprue system. A few disadvantages for this type of injection of plastic into an injection moulding tool result due to this.

Thus, the sprue must be separated from the component in a second working step. This can either be affected by way of additional functional elements in the tool or after removal from the mould in a manual manner or by machine. As a rule, a marking remains on the component after the separation of the sprue. Sharp edges can often remain without further post-machining steps.

As a consequence, a part of the raw material does not flow into the finished product and must either be reused or disposed of. Thus, the shot volume increases by way of the sprue, and more plastic must be plasticised than is finally present in the product. This is disadvantageous with regard to energy as well as the machine output. Moreover, the material costs due to the applied added material have a negative effect on the economics, in particular with expensive technical thermoplasts. The necessary post-machining of the product in the region of the injection point has a negative effect on the process efficiency and economics.

EP-A-1 346 808 then describes a hot-runner system for manufacturing injection moulded parts such as salad sieves, from two different thermoplastic plastics. The closure needle system operates with a single closure needle led in a runner, by way of which material feed channels arranged in an axial offset manner and which run out laterally into the runner can be closed. On injecting the first material, the channel confluence for the second material and which lies further distanced to the injection point is indeed sealed off by the closure needle, so that only the first material is injected into the tool cavity via the runner. On injecting the second material component however, the channel confluence for the first material must however be held open. A counter-pressure however is applied in the runner, in order despite this, to prevent the entry of the first material into this runner. The solution is complicated and is technically unsatisfactory, since it does not permit a strict material separation with the injection procedure.

It is therefore known to provide several closure needles that individually close the individual material feed channels. These closure needles with regard to the design are directed to a certain operating temperature and no longer seal satisfactorily given a significant deviation from the operating temperature. This is based on the fact that longitudinal expansion effects no longer permit a complete closure or sealing. The sealing in this case is affected by the closure needle onto a conical surface at the end of the needle. Length extension or expansion effects are transmitted 1:1 onto the sealedness due to this.

The injection moulding tool according to the invention is likewise designed as a tool with a hot-runner system of the type mentioned above, which comprises a hot-runner nozzle which runs out into a tool cavity and which is designed as a needle closure nozzle. The hot-runner nozzle comprises a first closure needle designed as a hollow needle as well as a second cylinder-shaped closure needle that can be inserted into the hollow needle nozzle. The first closure needle in the hot-channel nozzle, with the outwardly lying channel or runner wall forms an outer material feed channel and with its axial through-opening forms an inner material feed channel.

The invention is now characterised in that the hot-runner nozzle comprises a cylinder-shaped outlet opening, and the first closure nozzle a cylinder-shaped end section which is designed such that this can be inserted into the outlet opening with a positive fit, in order thus to seal the outer material feed channel to the tool cavity, amid the formation of a cylindrical sealing surface running parallel to the closure direction.

In a further development of the invention, the second closure needle likewise comprises a cylinder-shaped end section. The through-opening in the end section of the first closure needle is likewise cylinder-shaped and is designed in a manner such that the second closure needle can be inserted into the through-opening at the end section of the first closure needle with a positive fit. In this manner, the second closure needle is capable of sealing off the inner material feed channel to the tool cavity, amid the formation of a cylindrical sealing surface running parallel to the closure direction.

The closure needles can have lengths of 50 mm to 150 mm, in particular of about 100 mm. The diameter of the first closure needle is between 8 mm and 20 mm, preferably between 10 mm and 15 mm. The wall thickness of the first hollow-cylinder-shaped closure needle can be 0.3-1.2 mm, in particular 0.4 to 0.8 mm. The cylinder-shaped outlet opening of the first closure needle can have an axial length of 0.5-1.5 mm, in particular 0.7-0.9 mm.

The diameter of the second closure needle can be 0.6-2.5 mm, in particular 0.8-1.2 mm. The cylinder-shaped end section of the first closure needle can have an axial length of 1.2-2.4 mm, in particular from 1.5 to 2.1 mm.

The diameter of the second closure needle or the wall thickness of the first closure needle, the hollow needle, depends very much on the plastic component to be processed. Lower injection moulding pressures can be applied with material components of a low viscosity, i.e. with a good flowing behaviour, and the diameter of the material feed channels or the wall thicknesses and diameter of the nozzle components can be designed smaller, than if material components with a higher viscosity, i.e. with a poor flow behaviour must be processed. Thus the diameter or the wall thicknesses with the processing of polypropylene (PP) or a thermoplastic elastomer (TPE) must be smaller than with the processing of acid-modified polycyclohexylene dimethylene terephthalate (PCT-A).

An injection moulding tool can comprise one or a plurality of tool cavities in each case with a hot-runner nozzle. In the manner, several grip bodies can be simultaneously manufactured in one injection moulding tool. It is advantageous to independently control the individual injection moulding procedures with their associated tool cavities, although the injection moulding cycles should preferably be led synchronously for manufacturing several grip bodies. The hot-runner nozzles of the individual tool cavities are independently controllable in the present invention. The control of the injection moulding procedure is preferably affected via a control loop, into which the leading of the temperature also flows. The controls e.g. can be servo-controls. Thus, for example in particular opening times for the first or also the second material component can be individually set for each tool cavity. This procedure is based on the finding that the temperature control of the individual tool cavities and hot-runner nozzles, on which temperature control amongst other things the filling quantities or material quantities are also dependent, as a rule is not the same over all tool cavities, so that the points in time of the switch-over from the condition "nozzle open" to "nozzle closed" must be individually set. There are various factors that render the individual control of the hot-runner nozzles necessary. Thus, e.g. the length of the hot-runner system can be differently long with different hot-runner nozzles. Moreover, the control of the heat economy over the complete injection moulding tool is also a reason for the individual control of the hot-runner nozzles. Thus, the smallest of temperature changes in the injection moulding tool can have large effects on the manufacturing method.

The invention permits the manufacture of grip bodies, in particular of toothbrushes, with different optical appearance shapes and functional characteristics. Thus, toothbrushes with a large variability with regard to their functional characteristics and their optical appearance can be manufactured thanks to the method according to the invention and the associated device. The optical appearance is thereby defined by differently coloured or even transparent material components, which visualise the solidified flow structures of the material components. The functional characteristics are achieved by way of a targeted filling of the individual sections or regions of the grip body with the first and/or second material component and, as the case may be, further material components.

As a further design variant there is the possibility of replacing the second material component by a gas. With regard to the fashioning of the body, this means that the first material component completely surrounds the gas (except the injection point) in the final body. A cavity is formed by the gas in the inside of the body.

With regard to tooling technology, the nozzle can be designed equally with regard to the concept. However, certain differences result with regard to the tolerance and also additional seals in the region of the needles can be necessary. Nitrogen or noble gases such as argon can be applied as gases.

A high processing or machining reliability and manufacturing accuracy is ensured despite this large variability. The grip body according to the invention mover can be manufactured in a fully automatic manner.

BRIEF DESCRIPTION OF THE DRAWINGS

The subject-matter of the invention is hereinafter described in more detail by way of preferred embodiments that are represented in the accompanying drawings. The figures in each case show grip bodies of toothbrushes in their phase of creation or as completed injection moulded parts as well as parts of injection moulding tools. Shown schematically in each case are in:

FIGS. 1-4 are plan views that illustrate the manufacture of a grip body according to a first design variant by way of four schematic representations of a grip body. FIGS. 1-4 represent different method stages in the manufacturing process;

FIG. 15a . . . b: are cross-sectional elevation views through the grip body according to FIG. 13, in the region of the thumb rest;

FIG. 16a . . . b: are cross-sectional elevation views through the grip body according to FIG. 14 in the region of the thumb rest;

FIGS. 17-18: are cross-sectional elevation views through the grip part of the grip body according to FIGS. 10 to 14 and 19;

FIG. 19: is a plan view of a further embodiment of a grip body according to an embodiment type of the second design variant with a through-opening;

FIG. 20: is a plan view of a further embodiment of a grip body according to an embodiment type of the first design variant, with a through-opening;

FIG. 21: is an elevation view of the grip body according to FIG. 20;

FIGS. 22-24: are cross-sectional elevation views through the grip body of FIG. 20;

FIG. 29b is an elevation view of the grip body according to FIG. 29a; and

FIGS. 30a-30c are cross-sectional elevation views through the grip body of FIG. 29a.

Figures 5, 6, 7, 8:
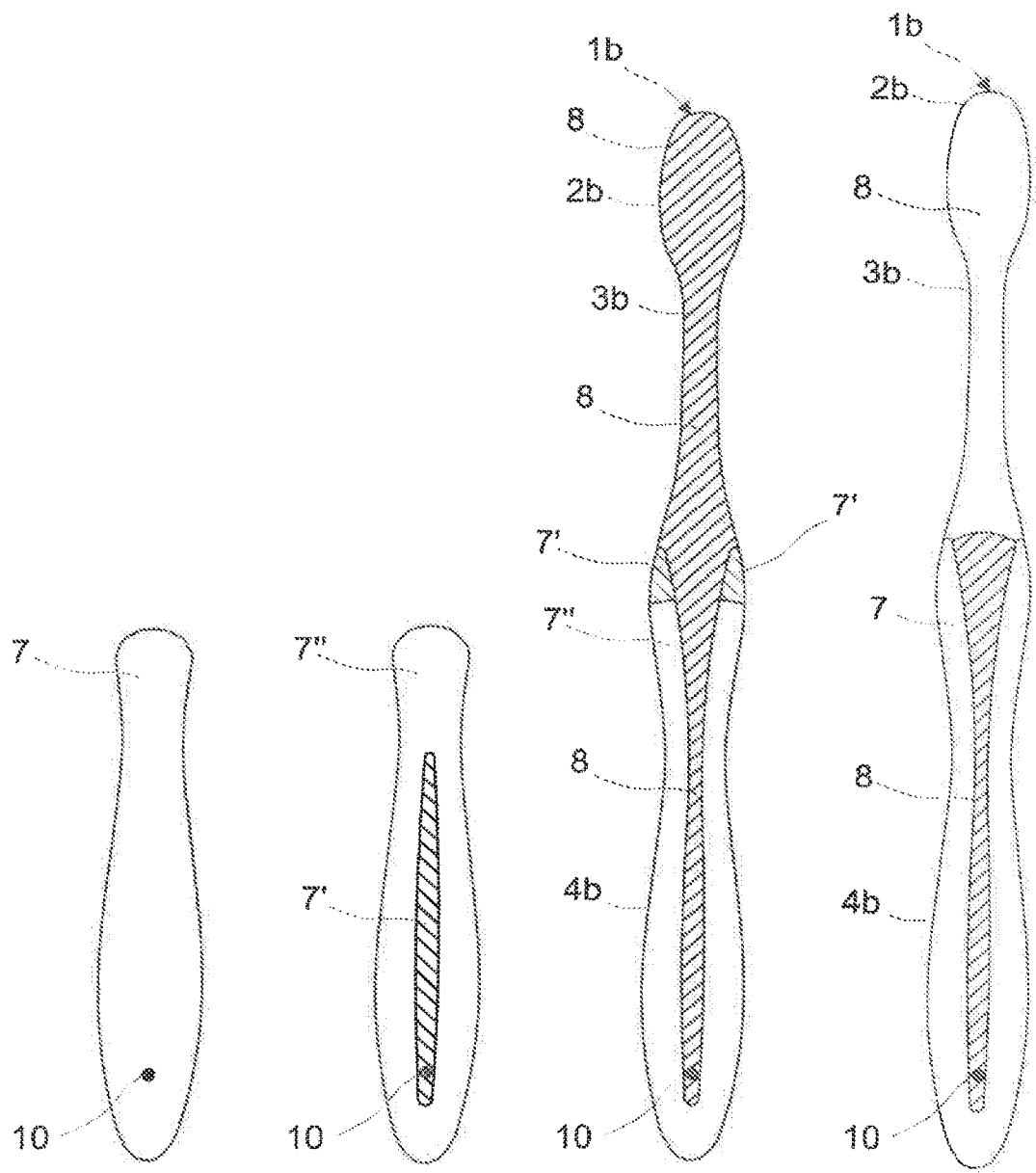
FIGS. 5-8 are plan views that illustrate the manufacture of a grip body according to a second design variant by way of four schematic representations of a grip body which represent different method stages in the manufacturing process.

The reference numerals used in the drawings and their significance are listed in a grouped manner in the list of reference numerals. Basically, in the figures, the same parts are provided with the same reference numerals. The volume ratios of material components that are represented in the figures serve only for illustration and do not necessarily correspond to a true-to-scale representation of the actual volume ratios.

Moreover, the invention is not restricted to the embodiments or design variants that are represented in the figures.

DETAILED DESCRIPTION OF THE INVENTION

FIGS. 1 to 4, in a purely schematic manner, show the manufacture of a grip body 1a according to a first design variant. For manufacturing the shown grip body 1 in the first design variant, a first material component 7 is injected into a tool cavity (not shown) in a first step. The tool cavity or the grip body to be manufactured 1a is a longitudinal component and comprises a grip part 4a, a neck part 3a and a head part 2a. The injection point 10 is arranged in the grip part 4a. The tool cavity in a first step is only partly filled with the first material component 7, wherein at least the grip part of the tool cavity is completely or at least partly filled with the first material component due to the arrangement of the injection point 10 in the grip part 4a. The injected first material component 7 thereby assumes the contour of the tool cavity in the grip part 4a (see FIG. 1). FIG. 1 schematically shows the outline contour of the body moulded in the first injection procedure with the first material component 7. The head part 2a and preferably also the neck part 3a of the tool cavity in contrast are not filled with the first material component 7 (compare also to FIG. 9).

The shown injection point 10 is indicated in this figure, as also in the further figures that show a plan view. The detail corresponds to the position of the injection point 10 on the body with a plan view. Normally, it is not visible due to its preferred position on the rear side of the grip body, but is shown despite this for the purpose of explaining the technology.

The injected first material component 7 subsequently to the first injection moulding step cools from the cavity wall to the core, wherein a warmer and still flowable soul 7' remains, which is surrounded by a jacket body 7" that is no longer flowable. This is represented schematically in FIG. 2. The flowable core 7' is represented in a hatched manner next to the outline contour of the body that is moulded in the first injection procedure with the first material component 7. The jacket body 7" that is no longer flowable is also recognisable.

In further step, the second material component 8 is injected into the tool cavity of the injection moulding tool through the same injection point 10. The result of this step is represented in the FIGS. 3 and 4. The second material component 8 is injected in the bodies shown in FIGS. 1 and 2 via the injection point 10 and displaces the flowable soul 7' in the direction of the head part 2a, which corresponds to the material flow direction in the too cavity. According to the present embodiment, the total volume of the tool cavity minus the volume of the injected first material component 7 as well as the volume of the flowable soul 7' at the point in time of injecting the second material component 8 is selected such that the soul 7' which is displaced into the head part 2a assumes the volume of the complete head part 2a (see FIG. 3). Thus, the head part 2a consists exclusively of the first material component 7 (see FIG. 4).

The second material component 8 amongst other things assumes the place of the displaced soul 7' in the grip part 4a (substitution), extends up to the neck part 3a and runs out in the neck part 3a in a tongue-like manner. The second material component 8 accordingly presses the flowable soul 7 onto the surface of the body and as a result is completely surrounded by the jacket body 7" and the flowable soul 7 of the first material component 7, with the exception of the injection point 10. The result of the injection of the second material component is shown in FIGS. 3 and 4. In FIG. 3, it is schematically shown how the different material components distribute or arrange themselves. The flowable soul 7 shown in FIG. 2 is again to be recognised in FIG. 3. As described, the flowable soul T is displaced in the direction of the head part 2a. What can likewise be recognised is the second material component 8 that takes the place of the flowable soul 7. This is indicated by a hatching.

Finally, one can recognise as to how the final product is divided up with regard to material in FIG. 4. After solidification, the jacket body 7" and the flowable soul 7 from the preceding process steps form a unit of the first material component 7 that completely surrounds the second material component 8. The second material component 8 is represented in a hatched manner.

As mentioned, once again a limited quantity of the first material component 7 can be injected via the common injection point 10 by way of a third injection moulding step, so that the second material component 8 is also surrounded by the first material component 7 in the region of the injection point 10 and in particular does not come to the surface of the grip body 1a at any location.

According to the present first design variant, the first and the second material components 7, 8 can be of a hard component of the type described above. The first material component 7 can be transparent and the second coloured or opaque, in order to achieve an optical effect. An interesting optical effect is achieved by way of this. The first material component 7 can be a soft component, for example a TPE in order to achieve a soft surface. The second material component 8 can be a hard component. Thereby, the hard component forms an element that gives the grip stability.

FIGS. 5 to 8 purely schematically show the manufacture of a grip body 1b according to a second design variant. In a first step, a first material component 7 is injected into a suitable tool cavity (not shown) for manufacturing the grip body 1b in the second design variant. The tool cavity or the grip body 1b to be manufactured is likewise a longitudinal component and comprises a grip part 4b, a neck part 3b and a head part 2b. The injection point 10 is arranged in the grip part 4b. The tool cavity in a first step is only partly filled with the first material component 7, wherein at least the grip part is completely or at least partly filled due to the arrangement of the injection point 10 in the grip part 4b. The injected first material component 7 thereby assumes the contour of the tool cavity in the grip part 4b (see FIG. 5). FIG. 5 schematically shows the outline contour of the body which is moulded with the first material component in the first injection procedure. The head part 2b and preferably also the neck part 3b of the tool cavity in contrast are not filled with the first material component 7 (compare FIG. 9).

The injected first material component 7 cools subsequently to the first injection moulding step, from the cavity wall towards the core, wherein a warmer and still flowable soul 7' remains, and this is surrounded by a jacket body 7" which is no longer flowable. This is schematically shown in FIG. 6. The flowable soul 7 is represented hatched next to the outline contour of the body moulded with the first material component 7 in the first injection procedure. The no-longer flowable jacket body 7" can also be recognised. In comparison the first design variant according to FIGS. 1 to 4, here the cooling process has already advanced further and the volume of the flowable soul 7' is accordingly smaller, or the wall thickness of the no longer flowable jacket body 7" is greater.

In a second step, the second material component 8 is injected into a tool cavity of the injection moulding tool through the same injection point 10. The result of this step is represented in FIGS. 7 and 8. The second material component is injected into the body shown in FIGS. 5 and 6 via the injection point 10 and displaces the flowable soul 7 in the direction of the head part 2b which corresponds to the material flow direction in the tool cavity. According to the present embodiment, the total volume of the tool cavity minus the injected first material component 7 as well as the volume of the flowable core 7' at the point in time of the injection of the second material component 8 is selected in a manner such that the displaced soul 7" runs out in the front grip part 4b or in the neck part 3b and only forms a jacket surface surrounding the second material component 8 (see FIG. 7). The volume of the soul 7' here is smaller than the volume of the head part 2b. For this reason, the second material component 8 in the front section of the grip part 4b or of the neck part 3b breaks out of the encasing through the first material component 7 and penetrates up to the surface or up to the cavity wall. The second material component 8 that has broken out to the front now fills the complete volume of the head part 2b and preferably also of the neck part 3b completely or in parts (see FIG. 8). Thus, the head part 2b and, as the case may be, the neck part 3b consists exclusively of the second material component 8. The second material component 8 moreover assumes the space of the displaced soul 7' in the grip part 4b, but there however is still surrounded by a jacket body 7" of the first material component 7. The second material component 8 of the grip body 1b is no longer completely surrounded by the jacket body 7" of the first material component 7. The result of the injection of the second material component is shown in the FIGS. 7 and 8. It is schematically shown in FIG. 7 as to how the different material shares distribute or arrangement themselves. The flowable core 7' shown in FIG. 6 can again be recognised in FIG. 7. It is displaced in the direction of the head part 2a as described, but only up to the connection to the break-out location of the second material component 8 from the no longer flowable jacket body 7". Likewise, to be recognised is the second material component 8 which comes to the place of the flowable soul 7' and then exits from the no longer flowable jacket body 7" and forms the head part 2b. This second component is likewise indicated by a hatching. Finally, the final product with regard to the division of the materials is shown in FIG. 8. After the solidification, the jacket body 7" and the flowable soul 7" from the preceding process steps form a unit of the first material component 7 that surrounds the second material component 8. The second material component is represented in a hatched manner, as long as it does not lie on the surface of the grip body 1b, and is subsequently no longer hatched.

As mentioned, once again a limited quantity of the first material component 7 can be injected via the common injection point 10 by way of a third injection moulding step, so that the second material component 8 is also surrounded by the first material component 7 in the region of the injection point 10.

According to the present second design variant, the first and the second material component 7, 8 can be of a hard component of the type described above. The first material component 7 can be transparent and the second be coloured or opaque or vice versa, in order to achieved an optical effect. An interesting optical effect is achieved by way of this. The first material component 7 can be a soft component for example a TPE, in order to achieve a soft surface in the grip region, and the second material component 8 can be a hard component. Thereby, the hard component forms an element that provides the grip with stability and finally also at least partly forms the neck part 3b and the head part 2b and accordingly ensures the functionality.

Basically, one can mathematically calculate whether the first or the second design variant is realised. The parameters that are used for the computation are the total volume of the tool cavity, the total volume of the first material component, as well as the volume of the flowable soul. Thereby, the volume of the flowable souk is time-dependent. I.e. the longer one waits or is cooled between the injection cycles, the smaller is this volume, since it cools, i.e. it solidifies and is no longer flowable. Then in each case, the residual volume in the tool cavity is compared to the volume of the flowable soul, in the assessment with regard to the design variant.

The first design variant that is shown in the FIGS. 1 to 4, results due to the following relation: the total volume of the tool cavity minus the total volume of the injected first material component is smaller than the flowable soul that is displaced by the second material component.

The second design variant that is shown in the FIGS. 5 to 8 results due to the following relation: the total volume of the tool cavity minus the total volume of the injected first material component is larger than the flowable soul that is displaced by the second material component.

The difference of the two design variants with regard to the volume ratios can be recognised when comparing FIGS. 4 and 6. With the first design variant, the flowable soul 7' assumes more space that with the second design variant. This means more material is substituted since the "flowable volume" is even greater.

Figure 9:
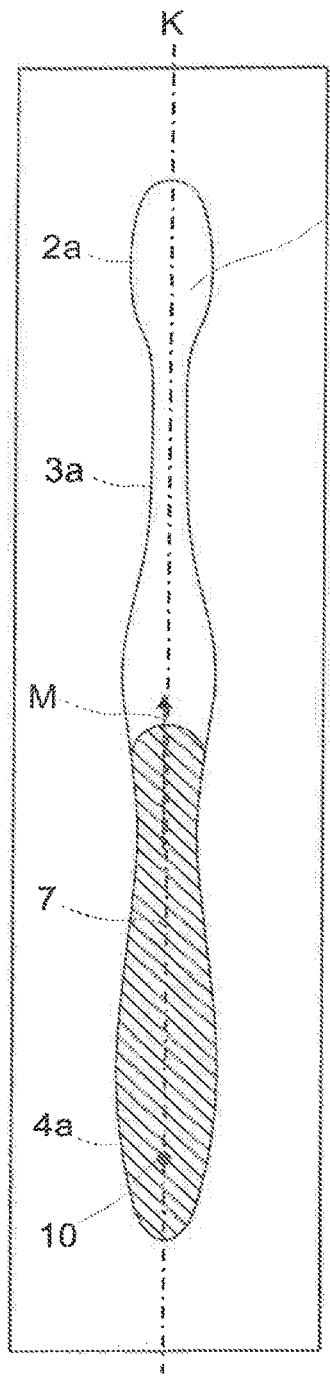
FIG. 9 is a plan view of a tool cavity for manufacturing a grip body after the injection of the first material component.

FIG. 9 shows the tool cavity 21 of an injection moulding tool after a completed first injection moulding procedure with a view from the mould partition onto the mould insert. Basically, this corresponds to a view onto the tool cavity 21, given an opened injection moulding tool after the first injection moulding procedure. The tool cavity 21 has a first material component 7 which is injected in the first injection moulding step and which corresponds to the represented material component 7 according to FIGS. 1 and 5. The body is represented in a hatched manner. Thereby, one can clearly recognised that the tool cavity 21 is not completely filled in the first injection moulding procedure. At least a part-region of the tool cavity 21 remains free. The contour of the tool cavity 21 can be recognised. The non-hatched regions are not yet filled with material. The material flow direction M is also indicated. It is directed from the injection point 10 in the direction of the head part 2a. After the grip part 4a is filled, the neck part 3a and the head part 2a also fill.

Figure 10:
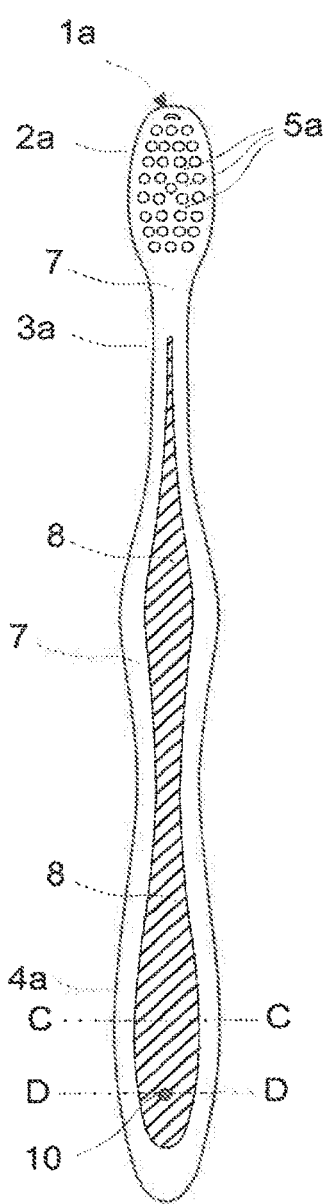
FIG. 10 is a plan view of a grip body according to a first design variant according to the FIGS. 1 to 4, after the injection of the second material component.

FIG. 10 shows a plan view of the grip body 1a according to the first design variant according to FIG. 4. This is manufactured according to the steps shown in FIG. 1 to 4. Bristle receiving holes 5a, into which the bristles of the toothbrush are introduced, are arranged in the head part 2a of the grip body 1a. The bristle receiving holes 5a in the present form however are not an essential feature of the invention. The second material component 8 which lies in the grip body 1a and which is completely surrounded by the first material component is represented in a hatched manner. Moreover, the second material component 8 runs out in a tongue-like manner, i.e. it does not end abruptly.

Figure 11:
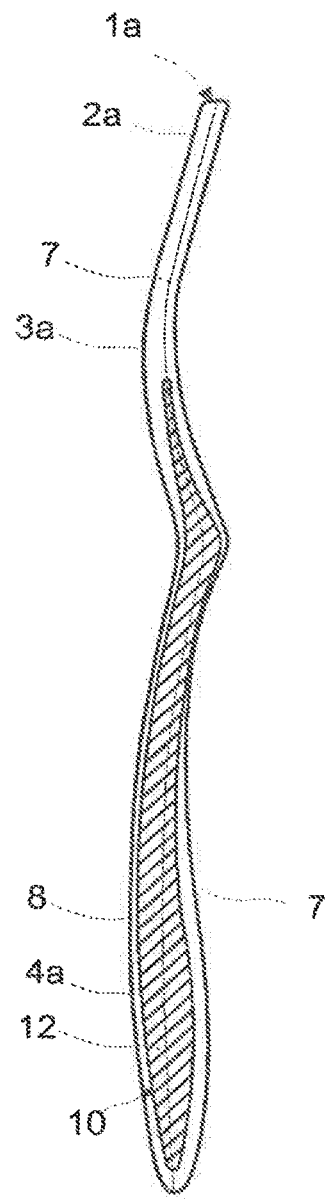
FIG. 11 is an elevation view of the grip body according to FIG. 10.

FIG. 11 shows the grip body 1a according to FIG. 10 in a lateral view. The mould partition line 12, along which the tool cavity was opened for removing the injection mould part from the mould is particularly visible from the lateral view. The mould partition line 12 is arranged laterally in a plan view of the grip body 1a. The mould partition line 12 runs without an interruption around the complete body. It is to be recognised that the second material component 8 is arranged on both sides of the mould partition line 12, thus runs past this. It is well recognisable in the lateral view as to how the shape of the second material component 8 follows the geometry of the outer contour at a distance that corresponds to the wall thickness, and also the tongue-like running-out of the second material component 8 can be easily recognised.

Figure 12:
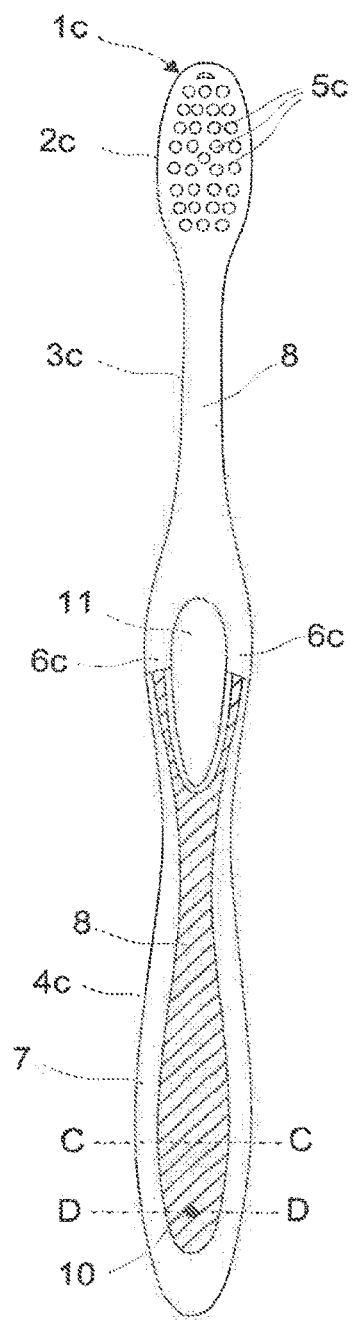
FIG. 12 is a plan view of a grip body according to an embodiment type of the second design variant with a through-opening.
Figure 13:
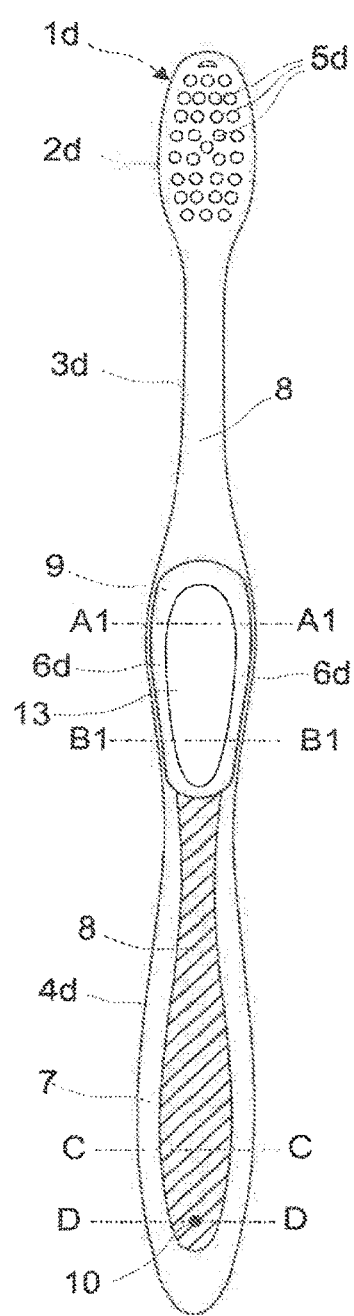
FIG. 13: is a plan view of a further embodiment of a grip body according to an embodiment type of the second design variant with a through-opening which is closed by a third material component.
Figure 14:
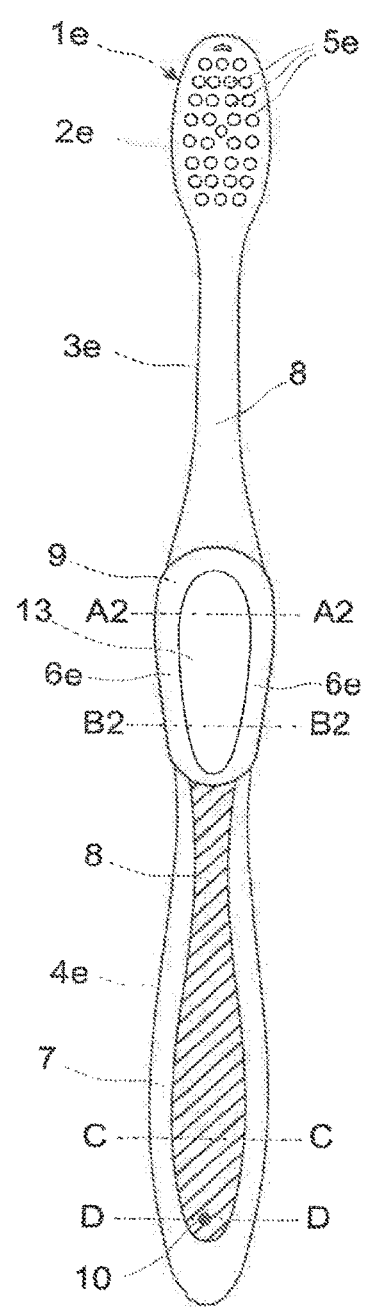
FIG. 14: is a plan view of a further embodiment of a grip body according to an embodiment type of the second design variant with a through-opening which is closed by a third material component.

FIGS. 12 to 14 show three grip bodies 1c, 1d, 1e in a plan view, which are manufactured according to an embodiment type of the second design variant. The grip body 1c shown in FIG. 12 can be used as an independent grip body without the application of a further material component being necessary, or it can serve as a base body for the grip body 1d and 1e. The grip bodies 1c, 1d, 1e likewise comprise a head part 2c, 2d, 2e, a neck part 3c, 3d, 3e as well as a grip part 4c, 4d, 4e. The injection point 10 is likewise arranged in the grip part 4c, 4d, 4e and preferably on the rear side of the grip part 4c, 4d, 4e.

The present embodiment of the second design variant is characterised by a through-opening 11 that is in the front grip part 4c, 4d, 4e and is arranged to the head part 3c, 3d, 3e. The through-opening 11 extends from the front side to the rear side and is delimited by two lateral part-arms 6c, 6d, 6e. The grip bodies 1c, 1d, 1e or their head part 2c, 2d, 2e comprise bristle receiving holes 5c, 5d, 5e for receiving bristles which are fastened in the bristle receiving holes 5c, 5d, 5e by way of anchoring. The bristle receiving holes in the present embodiment however are not a necessary feature of the invention.

The manufacture of the grip bodies 1c, 1d and 1e is effected basically in an analogous manner as the design variant according to the FIGS. 5 to 8, the only difference being that the tool cavity now still has an insert core which defines the through-opening of the grip body to be produced, and around which the material components 7, 8 flow in the material flow direction amid the division into two part-arms 6c, 6d, 6e and the subsequent reunification.

The first material component 7 in the grip part 4c, 4d, 4e and at least partly in a part section of the part arms 6c, 6d, 6e that connects to the grip part 4c, 4d, 4e forms a jacket body that encloses a core of the second material component 8. The material core departing from the grip part 4c, 4d, 4e likewise divides into two part-arms that are led around the through-opening (see FIG. 12). The division happens because the cooling from the cavity wall also applies to the insert core and thus the flowable soul also propagates into the part-arms 6c, 6d, 6e.

The second material component 8 thus here too takes the place of the displaced soul 7 in the grip part 4c, 4d, 4e, but there however is still surrounded by a jacket body of the first material component 7. As mentioned, once again a limited quantity of the first material component 7 can be injected via the common injection point 10 by way of a third injection moulding step, so that the second material component 8 is also surrounded by the first material component 7 in the region of the injection point 10.

The second material component 8 of the grip body 1*c*, 1*d*, 1*e* according to FIGS. 12, 13 and 14 in the region of the two part-arms breaks out of the encasing through the first material component 7 and comes to the surface of the grip body 1*c*, 1*d*, 1*e* over the whole periphery. Accordingly, the connecting neck part 3*c*, 3*d*, 3*e* and the head part 2*c*, 2*d*, 2*e* are formed completely by the second material component 8.

The breaking-out of the second material component 8 in the region of the part-arms 6*c* is deliberately selected. The region of the through-opening 11 is peripherally injected at least partly with a third material component 9 for the purpose of forming a thumb rest 13, as is evident from the embodiment according to FIGS. 13 and 14. The peripheral injection can be a covering of the part-arms 6*c* towards the through-opening 11 (see FIG. 13) or a covering around the grip body 1*e* in the region of the through-opening (see FIG. 14). The peripheral injection with the third material component 9 thus has two functions. On the one hand it serves for forming a thumb rest 13 as a rest surface and on the other hand it serves for covering the transition region between the first and the second material component in the region of the surface. In the variant shown in FIG. 12, the geometry of the through-opening 11 or the geometry around the through-opening 11 is selected such that these geometries form a thumb rest. In the case that the through-opening 11 is provided with a third material component, the geometry of the body lying therebelow does not necessarily have to be designed in such a manner.

The position of the break-out location is subjected to a certain tolerance amongst other things due to fluctuations of the characteristics of the plastics, the thermal balance in the injection moulding mould or in the hot-runner system and of the material metering of the second material component 8 and the first material component 7. The break-out location can vary in the region of the longitudinal axis. The position in the part-arms can also be unequal. Because of this, it is important for aesthetic reasons that this transition region, can be covered e.g. with a third material component 9.

According to the present embodiment type of the second design variant, the first and the second material component 7, 8 can be of a hard component of the type described above. One can also envisage the second material component 8 being of a hard component and the first material component 7 being of a thermoplastic elastomer of the type mentioned above. In order to achieve an optical effect, the first material component 7 can be transparent and the second material component 8 can be coloured, which is to say opaque, or vice versa. An interesting optical effect is achieved by this. The first material component 87 can be a soft component, for example a TPE, in order to achieve a soft surface in the grip region, and the second material component 8 can be a hard component. Thereby, the hard component forms an element that provides the grip with stability and finally also at least partly forms the neck part 3*b* and the head part 2*b* and accordingly ensures the functionality.

The second material component 8 that lies within the first material component 7 is represented in a hatched manner in the FIGS. 12 to 14. The neck part 3*c*, 3*d*, 3*e* and the head part 2*c*, 2*d*, 2*e* likewise consists of the second material component 8, but at this position however this lies on the surface of the grip body 1*c*, 1*d*, 1*e* and is therefore not represented in a dashed manner.

FIG. 15*a* shows a cross section through the grip body 1*d* according to FIG. 13 along the line B1-B1 in the grip-side region of the thumb rest 13. The two part-arms 6*d* comprise a core of the second material component 8 that is completely encased by the first material component 7. The outer side of the part-arms 6*d* which faces the through-opening 11 is moreover coated with a third material component 9. Thereby, the through-opening is filled completely with the third material component 9.

FIG. 15*b* shows a cross section through the grip body 1*d* according to FIG. 13 along the line A1-A1 in the head-side region of the thumb rest. The second material component 8 in the material flow direction or in the direction of the head part 2*d* has already completely broken out of the encasing through the first material component 7 at the height of the grip body 1*d* and completely fills out the volume of the part-arms 6*d*. The outer side of the part-arms 6*d* that faces the through opening 11 here too is also coated by a third material component 9, and the through-opening is completely filled with the third material component 9.

A comparison of the FIGS. 15*a* and 15*b* shows that the composition of the cross sections with regard to the material components or the cross-sectional areas of the material components changes. Whereas in FIG. 15*a* three material components are visible in cross section, in FIG. 15*b* it is then only two material components. The share of the first material component 7 at the cross section decreases in the direction of the head part of the grip body, until it is finally zero. Accordingly, the second material component 8 in the grip part or at the grip part side is enclosed by the first material component 7, whilst it then is covered by the third material component 9 in certain surface-parts on the head part side and is partly exposed.

FIG. 16*a* shows a cross section through the grip body 1*e* according to FIG. 14 along the line B2-B2 in the grip-side region of the thumb rest 13. The two part-arms 6*e* comprise a core of the second material component 8 that is completely encased by the first material component 7. The part arms 6*e* as such are completely coated by the third material component 9 and the through-opening is completely filled with the third material component 9. The outer side of the part-arms 6*e* is thus coated with a third material component 9 over the whole periphery. The break-out location of the second material component 8 from the first material component 7 can be completely covered in this manner.

FIG. 16*b* shows a cross section through the grip body 1*e* according to FIG. 14 along the line A2-A2 in the head-side region of the thumb rest 13. The second material component 8 is in the material flow direction or the direction of the head part 2*e* has already completely broken out of the encasing by the first material component 7 at this height of the grip body 1*e*, and completely fills out the volume of the part-arms 6*e*. The part-arms 6*e* as such are completely coated with a third material component 9 and the through-opening is completely filled with the third material component 9. With this, the outer side of the part-arms 6*e* is coated by a third material component 9 over the whole periphery. The location of the break-out of the second material component 8 from the first material component 7 can be completely covered by way of this. A grip body with a regular look can be created in this manner, since the break-out location which is burdened by a tolerance, is covered in this manner.

A comparison of the FIGS. 16*a* and 16*b* shows that the composition of the cross sections with regard to the material components or the cross-sectional areas of the material components changes. Whereas in FIG. 16*b* three material components are visible in cross section, it is only two material components in FIG. 16*b*. The share of the first material component 7 in the cross sections reduces in the direction of the head part of the grip body, until it is finally zero. Accordingly, the second material component 8 in the grip part or at the grip part side is enclosed by the first material component 7, whereas then it is enclosed by the third material component 9 at the head part side.

The application of a third material component 9 that is shown in the figures can be effected in different manners. It is shown in the figures that the third material component 9 is attached on the body through a through-opening 11 and also encloses this body at least in certain embodiments. The third material component 9 can of course also be applied, without it being led through a through-opening 11. The third material component 9 for example can be applied onto the surface of the existing parts by way of material fit characteristics. It is furthermore also possible to permit positive fits permitting the application on the surface, by way of geometric body designs.

Moreover, the third material component can be arranged in all parts of the grip body i.e. in the head part, neck part and/or grip part. The third material component thus for example in head part of a toothbrush can serve for forming a tongue cleaner or soft-elastic massage and cleaning elements. Moreover, the third material component can be a used for ergonomic or fashion aspects. Of course, the different applications can be combined.

FIG. 17 shows a cross section through the grip body 1c, 1d and 1e according to FIGS. 10, 12, 13 14 and 19 along the line C-C in the rear end section of the grip part 4c, 4d, 4e. The grip part 4c, 4d, 4e comprises a core of the second material component 8 which is completely encased by the first material component 7.

FIG. 18 shows a cross section through the grip body 1c, 1d and 1e according to the FIGS. 10, 12, 13, 14 and 19 along the line D-D in the rear end section of the grip part 4c, 4d, 4e at the height of the injection point 10. The grip part 4c, 4d, 4e comprises a core of the second material component 8 which is encased by the first material component 7. An opening through the encasing is formed in the injection point 10, through which opening the second material component 8 reaches to the surface. This opening typically represents the preferably cylindrical injection point. FIG. 18 shows what the injection point looks like if the first material component 7 is not injected a second time. If as already described, one once again injects the first material component 7 after injecting the second material component 8 then one can succeed in the cylindrical opening through the jacket body again being closed with material of the first material component 7. The second material component 8 would then not reach up to the surface.

It is recognisable in the sectional representations of FIGS. 15 to 18 as well as 22 to 24 as to how the wall thickness of the jacket body of the first material component 7 forms. This has a thickness of 0.5 mm-5 mm and in particular of 1.5 mm-3 mm. The wall thickness is basically dependent on the cooling.

FIG. 19 shows a further embodiment type of the second design variant. The grip body 1f likewise comprises a head part 2f, a neck part 3f as well as a grip part 4f. The injection point 10 in the grip part 4f is likewise visible. Moreover, the embodiment type is characterised by a through-opening 11 arranged to the neck part 3f in the front grip part 4f. The through-opening extends from the front side to the rear side and is bordered in by two lateral part-arms. The grip body 1f moreover comprises bristle receiving holes 5f for receiving bristles. The bristle receiving holes 5f, 5g in the present case however are likewise not an essential feature of the invention.

The manufacture of the grip body 1f is basically effected in an analogous manner as the second design variant according to the FIGS. 5 to 8, with the exception that the tool cavity now yet contains an insert core which defines the through-opening 11 of the grip body 1f to be produced, and around which the material components 7, 8 flow amid the division into two part-arms 6f and subsequent reunification in the material flow direction.

The first material component 7 in the grip part 4 as well as in the part-arms 6f forms a jacket body which encloses a material core of the second material component 8. The material core departing from the grip part 4f in the direction of the heat part 2f likewise divides into two part-arms which are led around the through-opening 11. The second material component 8 thus here assumes the place of the displaced soul 7 in the grip part 4f, but here however is still surrounded by a jacket body of the first material component 7.

As mentioned, a limited quantity of the first material component 7 can be injected via the common injection point 10 by way of a third injection moulding step, so that the second material component 8 is surrounded by the first material component 7 also in the region of the injection point 10.

The two part-arms of the second material component 8 of the grip body 1f according to the embodiment according to FIG. 19 reunify subsequently to the through-opening 11 in the direction of the head part 2f, so that a common line enveloped by the first material component 7 propagates in the direction of the head part 2f. The second material component 8 here does not break out of the encasing by the first material component 7 until subsequently to the through-opening 11, after the reunification of the part-arms and the material cores, and exits to the surface of the grip body if over the whole periphery. This e.g. can be affected before or in the neck part 3f. Accordingly, the connecting neck part 3f or at least a section thereof as well as the head part 2f are formed completely by the second material component 8.

Compared with FIG. 12, it is such that the position of break-out location where the second material component 8 breaks out of the first material component 7 is displaced towards the head part 2f. In the present case, the position of the break-out location depends on the material quantity which is injected into the tool cavity in the first injection moulding step. Since the break-out location in the grip body 1f of FIG. 19 lies closer to the head part 2f, and the material core of the second material component 8 is identical to that of FIG. 12, then comparing to FIG. 12 it can be said that with the body according to FIG. 19 more material has been brought into the tool cavity in the first injection moulding procedure.

Furthermore, the location of the break-out of second material component 8 from the first material component 7 can be changed by the cooling time or the time between the injection of the first material component 7 and the second material component 8. If an identical grip body is used and with regard to the first material component 7 the same quantity is injected, then the break-out location lies closer to the head part with a shorter cooling time than with a longer cooling time. This is due to the fact that with a shorter cooling time, the second material component substitutes much material in the grip part and less of the second material component flows into the free parts of the tool cavity, since the first material component has already been displaced to there. With a longer cooling time, the soul 7 which is only flowable to a small amount is in the grip part, which entails the second material component 8 substituting little material in the grip and mainly filling the free tool cavity, since generally little material of the first material component 7 continues to be displaced. What these considerations also show is the fact that the first design variant merges into the second design variant in a flowing manner, and everything depends essentially on the cooling time. Generally, it is the case that the complete volume is always the same, which means that as a whole, the first and the second material component 7, 8 together are always brought into the tool cavity with the same amount of material. In the present case, even the jacket shares are equally large. What changes in each case is the material distribution in the grip body.

With the injection moulding process of a grip body according to the first design variant, the cooling time after the introduction of the first material component 7 before introducing the second material component 8 is between 8 and 20 seconds. With the second design variant, the cooling time is between 20 and 35 seconds.

The two material components 7, 8 according to this embodiment can be of a hard component of the type described above. One can also envisage the second material component 8 being of a hard component and the first material component 7 being of a thermoplastic elastomer of the type described above, or vice versa. The first material component 7 can be transparent and the second material component 8 can be coloured or opaque, or vice versa, in order to achieve an optical effect. An interesting optical effect is achieved by way of this. The first material component 7 can be a soft component, for example a TPE, in order to achieve a soft surface in the grip region, and the second material component 8 can be a hard component Thereby, the hard component forms an element which provides the grip with stability and finally also at least partly forms the neck part 3b and the head part 2b and accordingly ensures the functionality.

The second material component 8 which lies within the first material component is represented in a hatched manner in FIG. 19. The head part 2f and at least partly also the neck part 3f consist of the second material component 8. However, at this position this lies on the surface of the grip body 1g and is therefore not represented in a dashed manner.

FIGS. 20 and 21 show a further embodiment type of grip bodies 1g according to the first design variant. The grip body 1g likewise comprises a head part 2g, a neck part 3g as well as a grip part 4g. The injection point 10 is likewise arranged in the grip part 4g. The present embodiment type is likewise characterised by a through-opening 11 arranged to the neck part 3g, in the front grip part 4g. The through-opening 11 extends from the front side to the rear side and is encompassed by two lateral part-arms 6g. The grip body 1g comprises bristle receiving holes 5g for receiving bristles. The bristle receiving holes 5g in the present form are however not a necessary feature of the invention.

The manufacture of the grip body 1g is basically effected in an analogous manner as the first design variant according to the FIGS. 1 to 4, only that the tool cavity now yet comprises an insert core which defines the through-opening 11 of the grip body 1g to be produced and around which the material components 7, 8 flow amid the division into two part arms 6g and the subsequent reunification in the material flow direction.

The first material component 7 in contrast to the very similar embodiments according to the FIGS. 12 to 14 and 19, in the grip part 4g as well as in the part-arms 6g forms a jacket body which encloses a material core of the second material component 8 which departing from the grip part 4g in the direction of the head part 2g likewise divides into two part-arms which are led around the through-opening 11 and then do not reunify. The first material component 7 with this design forms a protective layer around the second material component 8 which does not permit the second material component 8 to reunify again after the through-opening 11. This also means that the second material component 8 does not break through the first material component.

The second material component 8 thus here too takes the place of the displaced soul 7 in the grip part 4g, and there however is still surrounded by a jacket body of the first material component 7. As mentioned, yet again a limited quantity of the first material component 7 can be injected via the common injection point 10 in a third injection moulding step, so that the second material component 8 is surrounded by the first material component 7 also in the region of the injection point 10.

In the embodiment according to FIG. 20, the two part-lines of the second material component 8 do not reunify subsequently to the through-opening 11 in the direction of the head part 2g. In contrast, these run parallel at a distance next to one another into the neck part 3g. The two part lines run out in a tongue-like manner in the neck part 3g, without the second material component 8 in each case breaking out of the encasing by the first material component 7. Accordingly, the head part 2g is completely formed from the first material component 7. This embodiment is characterised by the particularly aesthetic effect of the part-lines which run in parallel. The two part-lines have a distance of 0.3 mm to 3 mm, preferably of 0.5 mm to 1.5 mm. They run out in an asymmetrical manner, which means to say that they are not equally long and thus their ends have a distance to one another of maximally 10 mm preferably 5 mm in the longitudinal axis direction.

In the shown figures, the through-opening is designed symmetrically with respect to the material flow direction. It is also possible to design the through-opening in an asymmetric manner. This leads to the fact that the distances between the part-lines as well as the distances between the ends of the part-lines can be infinitely varied. Of course, it is also possible to lead the second material component 8 up to into the head part 2g.

FIG. 21 shows a lateral cross section through the grip body 1g according to FIG. 20. The mould partition line 7 is likewise to be seen. It can be recognised that the second material component 8 is arranged on both sides of the mould partition line 12, thus runs past this.

The region of the through-opening 11, in the embodiment types shown in FIGS. 19, 20 and 21 can be peripherally injected (not shown) with a third material component 9, in a manner analogous to the embodiment according to FIGS. 13 and 14, for the purpose of forming a thumb rest 13. The peripheral injection can be a covering of the part-arms 6f, 6g towards the through-opening 11 or a covering around the grip body 11, 1g in the region of the through-opening.

The two material components 7, 8 according to this embodiment can be of a hard component of the type mentioned above. One can also envisage the second material component 8 being of a hard component and the first material component 7 of a thermoplastic elastomer of the type described above, or vice versa. The first material component 7 can be transparent and the second material component 8 can be coloured or opaque, or vice versa, in order to achieve an optical effect. An interesting optical effect is achieved by way of this. The first material component 7 can be a soft component, for example a TPE, in order to achieve a soft surface in the grip region, and the second material component 8 can be a hard component. Thereby, the hard component forms an element which gives the grip stability and finally also at least partly forms the neck part 3*b* and the head part 2*b* and accordingly ensures the functionality. The second material component 8 which lies within the first material component 7 is represented in a hatched manner in FIGS. 20 and 21. The head part 2*g* consists exclusively of the first material component 7. The neck part 3*g* consists at least partly of the first material component 7.

FIG. 22 shows a cross section through the neck part 3*g* of the grip body 1*g* according to the FIG. 20 along the line E-E. The cross-sectional view shows two part-lines of the second material component 8 which are completely encased by the first material component 7 and are moreover distanced to one another by way of a web of the first material component 7. The different hatchings indicate the different material components which are represented in section.

FIG. 23 shows a cross section through the grip body 1*g* according to FIG. 19 or 20 along the line F-F in the region of the thumb rest 13. The two part arms 6*g* comprise a core of the second material component 8 which is completely encased by the first material component 7. The material components of the part-arms which are represented in section are represented in a hatched manner. The through-opening is not represented in a dashed manner.

FIG. 24 shows a cross section through the grip part 4*g* of the grip body 1*g* according to FIG. 20, along the line G-G. The grip part 4*g* on its rear side comprises an indentation. The second material component 8 which is completely encased by the first material component 7 thereby comprises two kidney-like part-cores which are connected to one another via a connection web. The FIG. 24 shows how the cooling of the first material component functions. The body cools from the outer surface to the inside. The cooling follows the outer geometry. With a uniform cooling, as is represented, a no longer flowable jacket body 7" or in the end product a jacket body of the first material component 7 of a regular wall thickness is present all around. The second material component 8 is accordingly arranged in the inside of the body. In the present cross section, if the cooling time of the first material component is selected larger than has been selected for the shown grip body, it is possible for the no longer flowable jacket body 7" to unify in the middle region. Thereby, once would succeed in two part-lines consisting of the second material component 8 being formed, which are separated by a no longer flowable jacket body 7".

FIGS. 25 to 28 show cross-sectional views of a hot-runner nozzle 23 according to the invention, for manufacturing an injection moulded part by way of a co-injection method, with which at least two material components are injected one after the other into a tool cavity 21 by way of a common injection point. The hot-runner nozzle 23 comprises a channel (runner) with a channel wall 33 which runs out into a cylinder-shaped outlet opening 28. The outlet opening 28 runs out into the tool cavity 21 and preferably has a circular cross section. The channels of the hot-runner nozzle 23 are heated, preferably exclusively via the channel wall 33 from the outside.

The hot-runner nozzle 23 is preferably positioned with respect to the tool cavity 21 such that the closure direction of the needles V lies at an angle of 85° to 90° to the longitudinal axis of the tool cavity K.

The closure needles and material feed channels are preferably designed in a rotationally symmetrical manner (not the injection moulding tools per se). In the present case this means that the corresponding parts or volumes in the FIGS. 25 to 28, on account of the sectioned representation are recognisable at the left and right of the second closure needle 25.

A first closure needle 24 which together with the channel wall 33 forms an outer material feed channel 26 is introduced axially into the channel (runner). The outer material feed channel 26 is annular-shaped in the region of the closure needle 24. The first closure needle 24 is designed as a hollow needle and comprises an axial through-opening 29 which forms an inner material feed channel 27. The first closure needle 24 has a cylinder-shaped end section 30. This is preferably designed in a circularly cylindrical manner. The end section 30 together with the through-opening 29 forms a hollow cylinder section, wherein the through-opening 29 in the mentioned end section 30 likewise preferably has a circular cross section. The cylinder-shaped end section 30 of the first closure needle 24 engages into the cylinder-shaped outlet opening 28 with a positive fit, for the closure of the outer material feed channel 26.

A second closure needle 25 which is designed in a cylinder-shaped manner engages into the through opening 29. The inner material feed channel 27 is likewise designed in an annular manner at the height of the second closure needle 25. The second closure needle 25 comprises at least one cylinder-shaped, in particular circular cylinder-shaped end section 31. However it is particularly preferably completely designed in a cylinder-shaped or circular cylinder-shaped manner. The second closure needle 25 with its end section 31 positively engages into the hollow-cylinder-shaped end section 30 of the first closure needle 24, for closing the inner material feed channel 27 in the region of the through-opening 29.

FIGS. 25 to 28 now show different positions of the closure needles 24, 25 as to how they are situated during the manufacturing process.

Figure 25:
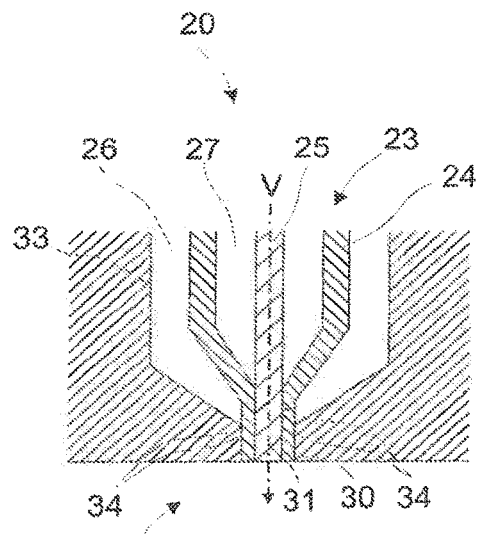
FIGS. 25-28: are cross-sectional elevation views of a hot-runner nozzle according to the invention, for manufacturing an injection moulded part.

According to FIG. 25, the first closure needle 24 engages into the cylinder-shaped outlet opening 28 and thus closes the outer material feed channel 26. Simultaneously, the second closure needle 24 engages into the hollow-cylinder-shaped end section 30 of the first closure needle 24 and thus closes the inner material feed channel 27. The hot-runner nozzle 23 is thus completely closed, wherein the first and the second closure needle 24, 25 with the face-sides lie flush with the cavity wall in the region of the outlet opening. As to when the hot-runner nozzle 23 is in the position shown in FIG. 25 can be deduced from the process course which is specified later.

Figure 26:
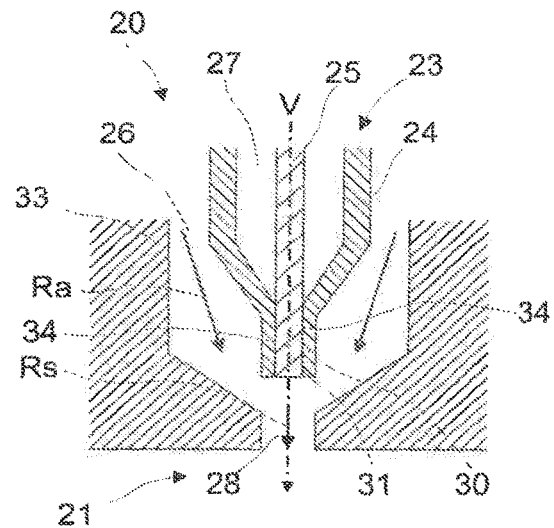

According to FIG. 26, the first closure needle 24 is retracted out of the cylinder-shaped outlet opening 28 and releases the outer material feed channel 26. Simultaneously, the second closure needle 25 engages into the hollow-cylinder-shaped end section of the first closure needle 24 and thus closes the inner material feed channel 27. The hot-runner nozzle 23 is thus only open for the material feed from the outer material feed channel 26. The fed material flows in the annular channel in a flow direction Ra along the first closure needle 24 towards the outlet opening 28 and is injected via the outlet opening 28 in the flow direction Rs into the tool cavity 21. The flow direction Rs here is parallel to the closure direction V of the closure needles 24, 25 and parallel to the longitudinal axis of the closure needles. For example, the first material component can be injected into the tool cavity 21 at the beginning of the injection moulding cycle with this nozzle setting. As to when the hot-runner nozzle 23 is in the position shown in FIG. 26 can be deduced from the process course specified later.

Figure 27:
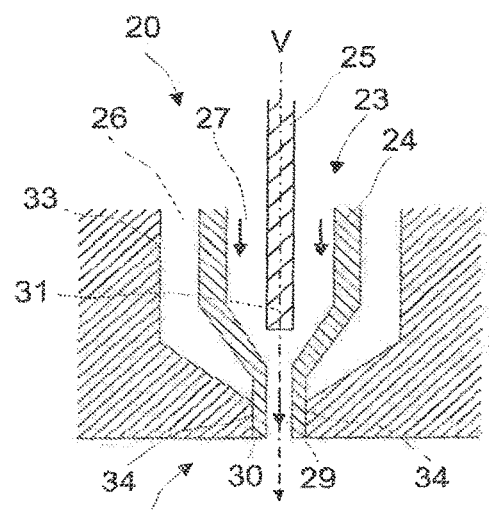

According to FIG. 27, the first closure needle 24 engages into the cylinder-shaped outlet opening 28 and thus closes the outer material feed channel 26. The second closure needle 25 however is retracted out of the hollow-cylinder-shaped end section 29 of the first closure needle 24 and thus releases the inner material feed channel 27. The hot-runner nozzle 23 is thus only open for the material feed from the inner material feed channel 27. The fed material flows in the inner channel in a flow direction Ri along the second closure needle 25 towards the outlet opening 28 and is injected via the outlet opening 28 in the flow direction Rs into the tool cavity 21. For example, the second material component can be injected into the tool cavity 21 in a subsequent step of the injection moulding cycle with this nozzle setting. As to when the hot-runner nozzle 23 is in the position shown in FIG. 27 can be deduced from the process course specified later.

Preferably, the material component with the higher melting point is fed via the outer material feed channel 26, since this is directly heatable via the channel wall 33. The material component with the lower melting point is preferably fed via the inner material feed channel 27 since the heating is indirect and also entails certain losses. If for example a PCT-A is applied at a first component 7 and a PP as a second component 8, in the grip body, it is then optimal if the PCT-A with the higher melting point is fed via the outer material feed channel 26, and the PP with the lower melting point via the inner material feed channel 27.

The settings of the temperatures are important. It can be the case that not every infinite material combination can be processed. The temperature in the inner material feed channel 27 must likewise be controlled externally since one heats only from the outside. If the temperature settings cannot be adhered to, then the plastic material can decompose.

It is also possible to process the material with the greater melting point in the inner material feed channel 27 if the temperature conditions can be set accordingly and the respective material components permit this.

Preferably, the first material component which corresponds to the firstly injected material component has a higher melting point than the second material component. It ensures the complete flowability of the second material component, even if the first material component in the tool cavity 21 has already cooled somewhat and is solidified as a jacket body.

The process course with regard to the positions of the hot-runner nozzle 23 which are shown in the FIGS. 25 to 27, given a closed tool cavity, is designed as follows:
1. hot-runner nozzle 23 is completely closed (see FIG. 25)
2. outer material feed channel 26 is opened (see FIG. 26)
3. hot-runner nozzle 23 is completely closed (see FIG. 25)
4. inner material feed channel 27 is opened (see FIG. 27)
5. hot-runner nozzle 23 is completely closed (see FIG. 25).

Thereby, it is also possible for the inner material feed channel 27 to be opened firstly and for this material to be fed and the material of the outer material feed channel 26 only being fed subsequently to this, depending on the configuration of the product with regard to the material components. This means that the steps 2 and 4 can be exchanged.

On injection moulding the first material component 7, the material feed channel is opened, the first material component 7 injected into the cavity, and the material feed channel is subsequently closed again. No holding pressure is required since the tool cavity 21 is not completely filled with the first material component 7. A holding pressure is applied on injection moulding the second material component 8 which completely fills the tool cavity 21. For the hot-runner nozzle, this means that it remains open, so that the holding pressure which is built up by the injection assembly onto the material component, acts on the material component in the tool cavity 21. The hot-runner nozzle 23 is closed again when the holding pressure is no longer required on account of the process course.

The step 3 corresponds to the cooling time which the first material component 7 requires, so that a no longer flowable jacket body 7" can form. Moreover, the step 5 also corresponds to the cooling time, but then such that the body at the end of the cooling time has enough stability so that this can be taken out of the tool cavity.

An important factor is the respective injection pressure of the material components. The injection pressure for the first material component 7 is the same as with the manufacture of a conventional grip body, in particular for a toothbrush. As described, no holding pressure is built up after the material feed. The injection of the second material component 8 with regard to pressure is designed equally as with the standard injection moulding processes of grip bodies, in particular toothbrushes. The holding pressure is then applied with the second material component 8.

The size of the injection pressure cannot be generally defined, since it depends on different factors. These factors are for example: material characteristics, nozzle geometry or the size of the inlet cross section (outlet opening of the hot-runner nozzle, through-opening of the hot-runner nozzle). The injection pressure increases if the inlet cross section becomes smaller for example.

Figure 28:
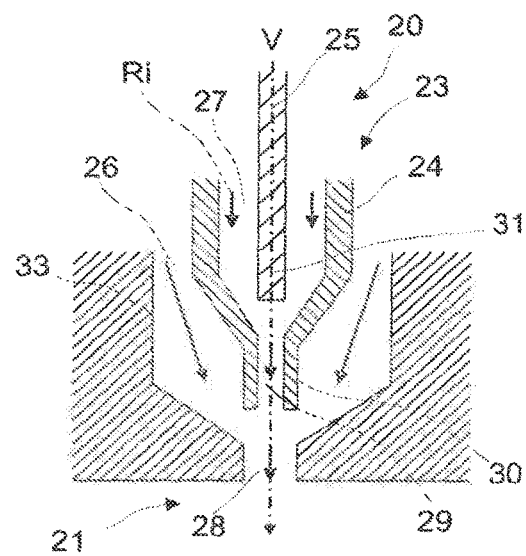

According to FIG. 28, the first closure needle 24 is retracted out of the cylinder-shaped outlet opening 28 and releases the outer material feed channel 26. The second closure needle 25 is likewise retracted from the hollow-cylinder-shaped end section 30 of the first closure needle 24 and releases the inner material feed channel 27. The hot-runner nozzle 23 is thus open for the material feed from the inner as well as form the outer material feed channel 26, 27. The first and the second material components can be simultaneously injected into the tool cavity with this nozzle setting. FIG. 28 merely represents one technical possibility of a nozzle setting. This nozzle setting with regard to the present invention has a subordinated significance, since the first and second material component are preferably injected in a strictly sequential and not simultaneously or overlapping manner.

The cylinder-shaped sealing surfaces 34 for the first closure needle 24 and the second closure needle 25 lie parallel to the closure direction V. Since the closure direction V now lies parallel to the longitudinal axis of the closure needles 24, 25, the thermal expansion of the closure needles 24, 25 practically has no influence on the quality of the sealing of the closure. The closure needles 24, 25 for example can have a length of about 100 mm, whereas their diameter can be e.g. maximally 2.5 mm. If now the injection moulding tool is operated at different temperatures depending on the applied plastic, then the length expansion of the closure needle which can be significant in such a case, may not have any influence on the sealing. This is ensured by the present hot-runner nozzle 23 since the length expansion of the closure needles 24, 25 has no influence on the formation of the sealing surfaces 34. The thermal expansion of the closure needles 24, 25 transversely to the longitudinal axis in contrast is negligible or within a manageable tolerance due to the relative small diameter of the closure needles 24, 25. This has no noticeable effect on the quality of the sealing of the closure.

The opening distances of the needles, which is to say how far the needle displaces from the tool cavity with respect to the closure position of the closure needle, in order to permit the material component to flow in, depends on different factors. These factors can for example be the material characteristics of the material component in the respective material feed channel or the geometry of the nozzle. The travel therefore cannot be generally set.

The closure needles 24 and 25 are preferably manufactured of a tempered steel.

An important advantage of the invention is the fact that its implementation only requires modifications to the tool plate of an existing injection moulding tool, specifically on the nozzle side of the tool plate. Thus, in the case that the geometries and the appearance of the grip bodies match, existing injection moulding tools can be converted by way of retrofitting the tool plate on the nozzle side, to the technology according to the invention. New product designs with half the effort can be realised in this manner.

FIGS. 29a, 29b and 30a to 30c show a further embodiment type of a grip body 1h. The grip body 1h with the exception of the differences mentioned hereinafter corresponds to the design variant of the grip body 1g according to FIGS. 20 and 21.

The grip body 1h likewise comprises a head part 2h, a neck part 3h as well as a grip part 4h. The injection point 10 is likewise arranged in the grip part 4h.

The present embodiment type differs to the design variant according to FIGS. 20 and 21 in that one makes do without the through-opening. A narrowing in the cross section of the grip body 1h is made instead of this. The grip body 1h in this narrowing forms a wall region 14 which is encompassed laterally by part-arms 6h.

The grip body 1b comprises bristle receiving holes 5h for receiving bristles. The bristle receiving holes 5h in the present form however are not an essential feature of the invention.

The manufacture of the grip body 1h is affected basically in an analogous manner as the first design variant according to the FIGS. 1 to 4 or 20 and 21, only here it is the case that a wall region is formed in the cross-sectional narrowing of the grip body 1h.

The first material component 7 with this design forms a protective layer around the second material component 8 which does not permit the second material component 8 to reunify again after the narrowing in cross section. This also means that the second material component 8 does not break through the first material component in the direction of the head part 2h.

Analogously to the embodiment according to FIGS. 20 and 21, the two part-lines of the second material component 8 in FIGS. 29a and 29b also do not reunify subsequently to the narrowing of the cross section, in the direction of the head part 2h. In contrast, these run in parallel and at a distance to one another into the neck part 3h. In the neck part 3h, the two part-lines run out in a tongue-like manner without the second material component 8 breaking out of the encasing through the first material component 7 in each case. Accordingly, the head part 2h is formed completely from the first material component 7.

The present embodiment is characterised by the particularly aesthetic effect of the part-lines which run in parallel. The two part lines have a distance of 0.3 mm to 3 mm, preferably of 0.5 mm to 1.5 mm. If they run out in an asymmetrical manner, which is to say they are not equally long, then their ends have a distance of maximal 10 mm preferably maximally 5 mm to one another in the longitudinal axis direction.

The narrowing of the cross section is designed symmetrically with respect to the material flow direction in the shown figures. It is also possible to design the narrowing of the cross section in an asymmetrical manner. This leads to the distances between the part lines as well as the distances between the ends of the part-likes being able to be varied infinitely. Of course, it is also possible to lead the second material component 8 up to into the head part 2h.

Figure 29A:
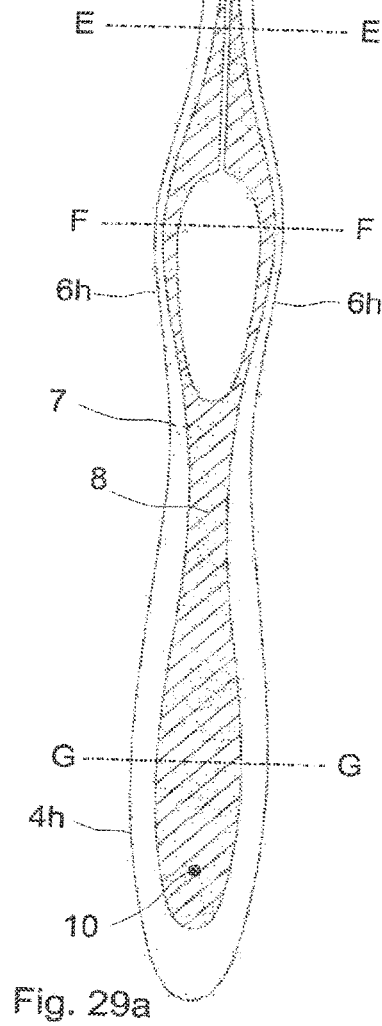
FIG. 29a: is a plan view of a further embodiment of a grip body according to an embodiment type of the first design variant with a narrowing, in cross section.
Figure 29B:
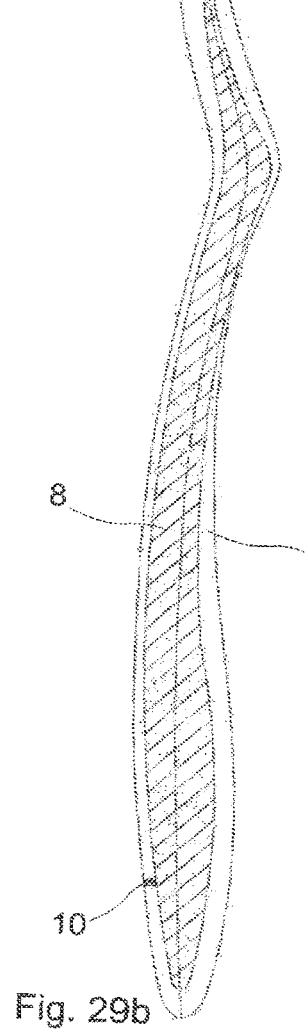

Analogously to the embodiment according to FIGS. 13 and 14, the region of the narrowing of the cross section, in the embodiment type shown in FIGS. 29a and 29b, can be peripherally injected (not shown) with the third material component, for the purpose of forming a thumb rest. The peripheral injection can for example be a covering of the part-arms 6h around the grip body 1h in the wall region 14 of the cross-sectional narrowing.

According to the FIGS. 29a and 29, the second material component 8 which lies within the first material component 7 is represented in a dashed manner. The head part 2h consists exclusively of the first material component 7. The neck part 3h consists at least partly of the first material component 7.

Figure 30A:
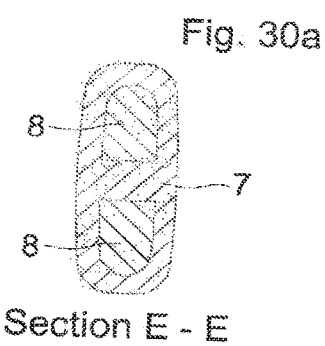

The cross section through the neck part 3h of FIG. 29a along the section line E-E according to FIG. 30a corresponds to that cross section which is shown in FIG. 22. For this reason, the description with regard to FIG. 22 is referred to for further details.

Figure 30B:
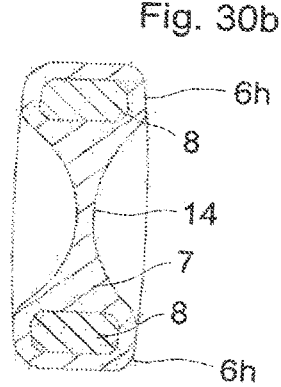
Figure 30C:
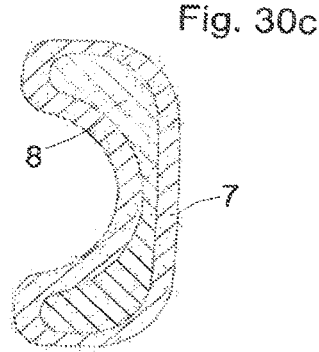

The cross section through the grip part 4h along the section line G-G according to FIG. 30c e.g. is designed as shown in FIG. 24. A narrowing of the cross section in the grip part 4h has already been described within the framework of the description of FIG. 24. The description with regard to FIG. 24 is therefore referred to for further details.

FIG. 30b shows a cross section through the grip body 1h according to FIG. 29a along the section line F-F in the region of the thumb rest One can see that the second material component 8i does not penetrate into the wall region of the cross-sectional narrowing. In contrast the second material component 8 flows around the narrowing of the cross section at the sides, which means through the part-arms 6h.

The shape of the part-strands of the second material component 8 laterally of the narrowing of the cross section through the two-arms 6h depends on how the wall region 14 in the cross-sectional narrowing is designed.

The diameter or the distance of the surfaces in the region, in which the layers unify is between 0.3 mm and 5 mm preferably between 0.5 mm and 1.5 mm. Thereby, the wall thickness is directly related to the method. Greater masses require more cooling time, and smaller masses less cooling time. Such a narrowing directly influences the cycle time depending on how the remaining body is designed. What is decisive is that the wall region 14 after the first cooling cycled has cooled and solidified to such an extent that the second component can no longer penetrate into this.

The part-lines with regard to their dimensions are designed as previously described The design variants which are shown in this document are of course examples. The individual fashioning and elements of these design variants can be combined with other design variants within the scope of the invention and without departing from the scope of the invention. The features of the figure descriptions can be combined with one another beyond the individually shown embodiments, in particular of the embodiments have the same or similar fashion

LIST OF REFERENCE NUMERALS

1a . . . h grip body of a toothbrush
2a . . . h head part

3a...h neck part
4a...h grip part
5a...h bristle receiving holes
6c...h part arms
7 first material component
7' flowable soul of the first material component, corresponds to the core body
7" no longer flowable jacket body of the first material component, corresponds to the jacket body
8 second material component
9 third material component
10 injection point
11 through-opening
12 mould partition line
13 thumb grip
14 wall region
20 injection moulding tool
21 tool cavity
22 cavity wall
23 hot-runner channel
24 first closure needle
25 second closure needle
26 outer material feed channel
27 inner material feed channel
28 cylinder-shaped outlet opening
29 through-opening of the first closure needle
30 end section of the first closure needle
31 end section of the second closure needle
33 channel wall
34 sealing surface
V closure direction of the needles
K longitudinal axis of the tool cavity
M material flow direction
Ra flow direction
Ri flow direction
Rs flow direction

The invention claimed is:

1. A method for manufacturing at least one grip body of a body care article, each of the at least one grip body having a grip part, a neck part, and a head part, the manufacturing being performed via an injection moulding tool with at least one first tool cavity and at least one second tool cavity, and each of the at least one grip body including a first material component, a second material component, and a third material component formed of a first thermoplastic material, a second thermoplastic material, and a third thermoplastic material, respectively, the method comprising steps of:

manufacturing at least one intermediate grip body, each of the at least one intermediate grip body including a jacket body formed of the first material component and a core body formed of the second material component partially enveloped by the jacket body, whereby a hot-runner system injection moulds the first thermoplastic material and the second thermoplastic material into each of the at least one first tool cavity to form each of the at least one intermediate grip body using a hot-runner nozzle of the hot-runner system, the injection moulding of the hot-runner system being performed by:

injection moulding the first thermoplastic material into each of the at least one first tool cavity to partially fill each of the at least one first tool cavity with the first thermoplastic material, and followed by a cooling phase of the injected first thermoplastic material, injection moulding the second thermoplastic material into each of the at least one first tool cavity partially filled with the first thermoplastic material to completely fill up each of the at least one first tool cavity with the second thermoplastic material injected into and through the injected first thermoplastic material, thereby forming each of the at least one intermediate grip body from the first and second material components completely filling each of the at least one first tool cavity, wherein a flowable soul of the injected first thermoplastic material is displaced during the second thermoplastic material injecting, the second thermoplastic material comes to a surface of each on the at least one intermediate grip body at an injection point of the second thermoplastic material arranged on a rear side of each of the at least one intermediate grip body, and the core body of the second thermoplastic material is surrounded in a flow direction of the second thermoplastic material by the jacket body of the first thermoplastic material for each of the at least one intermediate grip body;

removing each of the at least one intermediate grip body from each of the at least one first tool cavity, the intermediate grip body removed from each of the at least one first tool cavity being formed without a sprue due to the intermediate grip body injection moulding as performed by the hot-runner system, thereby allowing for the removed intermediate grip body to be directly transferred into a respective one of at least one second tool cavity of the injection moulding tool without additional machining;

transferring each of the at least one intermediate grip body into a respective one of at least one second tool cavity of the injection moulding tool; and injection moulding the third thermoplastic material into each of the at least one second tool cavity to form the third material component including at least one of a holding element, a thumb rest, a decorative element, or a covering element of the third material component on each of the at least one intermediate grip body to form the at least one grip body from the first material component, the second material component, and the third material component, the third material component of each of the at least one grip body contacting both the first and second material components.

2. The method according to claim 1, wherein the third thermoplastic material is a soft-elastic thermoplastic material including a thermoplastic elastomer.

3. The method according to claim 1, wherein:
the injection moulding tool includes a plurality of the first tool cavities, and
the hot-runner system includes a plurality of hot-runner nozzles, each of the plurality of the first tool cavities having a corresponding one of the plurality of hot-runner nozzles for manufacturing one of the intermediate grip bodies, and each of the plurality of hot-runner nozzles being independently controlled.

4. The method according to claim 1, wherein an injection point of the first material component is arranged such that the first thermoplastic material is injected into each of the at least one first tool cavity transversely to a longitudinal axis of each of the at least one first tool cavity.

5. The method according to claim 1, wherein the injection point of the second thermoplastic material is arranged in the middle longitudinal axis of each of the at least one intermediate grip body.

6. The method according to claim 1, wherein the cooling phase is 2 seconds to 35 seconds.

7. The method according to claim 1, wherein during the injecting of the second thermoplastic material, an injection pressure is maintained, and a holding pressure is applied to ensure the complete filling up of the at least one first tool cavity with the second thermoplastic material injected into and through the injected first thermoplastic material.

8. The method according to claim 1, wherein at a front end section of the grip part, on a front side, a thumb rest of the third material is formed for supporting a hold grip, and a cross-sectional view through the at least one grip body in the region of the thumb rest includes a core of the second material component which is encased by the first material component, and on the front side, an outer side of the at least one grip body which is coated with the third material component of the thumb rest.

9. The method according to claim 1, wherein the head part of each of the at least one grip body comprises the first material component.

10. The method according to claim 1, wherein the second material component, based on the place of the displaced flowable soul of the injected first thermoplastic material, extends up to the neck part and runs out in the neck part in a tongue-like manner.

11. The method according to claim 1, wherein the first thermoplastic material is transparent and the second thermoplastic material is colored or opaque.

12. The method according to claim 11, wherein the first and the second thermoplastic material components include an identical thermoplastic material, with the exception that the first thermoplastic material is transparent and the second thermoplastic material is colored or opaque.

13. The method according to claim 1, wherein the first and second thermoplastic materials are a type of polyester.

14. The method according to claim 13, wherein the polyester is one of:
   polyethylene terephthalate (PET) in the form of acid-modified polyethylene terephthalate (PETA); and
   glycol-modified polyethylene terephthalate (PETG).

15. The method according to claim 13, wherein the polyester is one of:
   a polybutylene terephthalate (PTB);
   an acid-modified polycyclohexylene dimethylene terephthalate (PCT-A); and
   a glycol-modified polycyclohexylene dimethylene terephthalate (PCT-G).

16. The method according to claim 1, wherein the injection point of the second material component is arranged such that the second thermoplastic material is injected into each of the at least one first tool cavity transversely to a longitudinal axis of the at least one first tool cavity.

17. The method according to claim 1, wherein the injection point of the second material component is arranged on an end section of the grip part of each of the at least one grip body.

18. The method according to claim 1, wherein the injection point of the second material component is distanced by 1-20 mm from a grip-side end of each of the at least one grip body.

19. The method according to claim 1, wherein the injection point of the second material component is distanced by 3-8 mm from a grip-side end of each of the at least one grip body.

20. The method according to claim 1, wherein the third material component is arranged on the grip part so as to fill a through-opening of each of the at least one intermediate grip body.

21. The method according to claim 1, wherein the injection point of the second thermoplastic material is arranged outside a mould partition line formed by a mould partition.

22. A method for manufacturing at least one grip body of a body care article, each of the at least one grip body having a grip part, a neck part, and a head part, the manufacturing being performed via an injection moulding tool with at least one first tool cavity and at least one second tool cavity, and each of the at least one grip body including a first material component, a second material component, and a third material component formed of a first thermoplastic material, a second thermoplastic material, and a third thermoplastic material, respectively, the method comprising steps of:
   manufacturing at least one intermediate grip body, each of the at least one intermediate grip body including a jacket body formed of the first material component and a core body formed of the second material component partially enveloped by the jacket body, whereby a hot-runner system injection moulds the first thermoplastic material and the second thermoplastic material into each of the at least one first tool cavity to form each of the at least one intermediate grip body using a hot-runner nozzle of the hot-runner system, the injection moulding of the hot-runner system being performed by:
      injection moulding the first thermoplastic material into each of the at least one first tool cavity to partially fill each of the at least one first tool cavity with the first thermoplastic material, and
      followed by a cooling phase of the injected first thermoplastic material, injection moulding the second thermoplastic material into each of the at least one first tool cavity partially filled with the first thermoplastic material to completely fill up each of the at least one first tool cavity with the second thermoplastic material injected into and through the injected first thermoplastic material, thereby forming each of the at least one intermediate grip body from the first and second material components completely filling each of the at least one first tool cavity, wherein a flowable soul of the injected first thermoplastic material is displaced during the second thermoplastic material injecting, the second thermoplastic material comes to a surface of each of the at least one intermediate grip body at an injection point of the second thermoplastic material arranged on a rear side of each of the at least one intermediate grip body, and the core body of the second thermoplastic material is surrounded in a flow direction of the second thermoplastic material by the jacket body of the first thermoplastic material for each of the at least one intermediate grip body;
   transferring each of the at least one intermediate grip body into a respective one of at least one second tool cavity of the injection moulding tool; and
   injection moulding the third thermoplastic material into each of the at least one second tool cavity to form the third material component including at least one of a holding element, a thumb rest, a decorative element, or a covering element of the third material component on each of the at least one intermediate grip body to form the at least one grip body from the first material component, the second material component, and the third material component, the third material component of each of the at least one grip body contacting both the first and second material components.

\* \* \* \* \*